US012608207B2

(12) United States Patent
 Sakashita

(10) Patent No.: US 12,608,207 B2
(45) Date of Patent: Apr. 21, 2026

(54) PROCESSOR SELECTIVELY EXECUTING FIRST INSTRUCTION USING NON-PRE-PROCESSED DATA OR SECOND INSTRUCTION USING PRE-PROCESSED DATA

(71) Applicant: Fujitsu Limited, Kawasaki (JP)

(72) Inventor: Sota Sakashita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 27 days.

(21) Appl. No.: 18/216,780

(22) Filed: Jun. 30, 2023

(65) Prior Publication Data

US 2024/0118891 A1 Apr. 11, 2024

(30) Foreign Application Priority Data

Oct. 11, 2022 (JP) ................................. 2022-163027

(51) Int. Cl.
 *G06F 9/30* (2018.01)
 *G06F 9/48* (2006.01)
(52) U.S. Cl.
 CPC ...... *G06F 9/30079* (2013.01); *G06F 9/30145* (2013.01); *G06F 9/4812* (2013.01)
(58) Field of Classification Search
 CPC . G06F 9/30079; G06F 9/30145; G06F 9/4812
 See application file for complete search history.

(56) References Cited

U.S. PATENT DOCUMENTS

| | | | | |
|---|---|---|---|---|
| 5,438,668 | A * | 8/1995 | Coon | G06F 9/30174 |
| | | | | 712/E9.031 |
| 6,807,624 | B1 | 10/2004 | Asakawa | |
| 7,587,582 | B1 * | 9/2009 | Sudharsanan | G06F 9/3877 |
| | | | | 708/100 |
| 2004/0003212 | A1 * | 1/2004 | Mitsuishi | G06F 9/30149 |
| | | | | 712/E9.034 |
| 2018/0373535 | A1 * | 12/2018 | Zhang | G06F 9/30014 |
| 2019/0065145 | A1 * | 2/2019 | Robinson | G06F 5/01 |
| 2020/0218538 | A1 * | 7/2020 | Mansell | G06F 9/3001 |

FOREIGN PATENT DOCUMENTS

JP 2000-181705 A 6/2000

* cited by examiner

*Primary Examiner* — Shawn Doman
(74) *Attorney, Agent, or Firm* — WHDA, LLP

(57) ABSTRACT

A processor includes an operation executer configured to execute pipeline processing of an operation instruction, wherein the operation executer includes a first register configured to hold data to be used for an operation; a pre-processor configured to pre-process data held in the first register; a second register configured to hold the data pre-processed by the pre-processor; an operator configured to execute an operation on the data held in the first register or the data held in the second register; and a selector configured to connect an output of the first register or an output of the second register to an input of the operator.

5 Claims, 16 Drawing Sheets

20
OPERATION EXECUTER

EXECUTION EXAMPLE (1)

| CYCLE | 1 | 2 | 3 | 4 | 5 | 6 | 7 | 8 | 9 | 10 | 11 | 12 |
|---|---|---|---|---|---|---|---|---|---|---|---|---|
| FMLA(by element) | P | PT | B | BX1 | X1 | X2 | X3 | X4 | U | | | |
| FMLA(by element) | | P | PT | B | BX1 | X1 | X2 | X3 | X4 | U | | |
| FMLA(by element) | | | P | PT | B | BX1 | X1 | X2 | X3 | X4 | U | |
| FMLA(by element) | | | | P | PT | B | BX1 | X1 | X2 | X3 | X4 | U |

EXECUTION EXAMPLE (2)

| CYCLE | 1 | 2 | 3 | 4 | 5 | 6 | 7 | 8 | 9 | 10 | 11 |
|---|---|---|---|---|---|---|---|---|---|---|---|
| FMLA | P | PT | B | X1 | X2 | X3 | X4 | U | | | |
| FMLA | | P | PT | B | X1 | X2 | X3 | X4 | U | | |
| FMLA | | | P | PT | B | X1 | X2 | X3 | X4 | U | |
| FMLA | | | | P | PT | B | X1 | X2 | X3 | X4 | U |

EXECUTION EXAMPLE (1)

| CYCLE | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| FMLA(by element) 1ST FLOW | P | PT | B | X1 | U | | | | | | | | | | |
| FMLA(by element) 2ND FLOW | | P | PT | B | X1 | X2 | X3 | X4 | U | | | | | | |
| FMLA(by element) 1ST FLOW | | | P | PT | B | X1 | U | | | | | | | | |
| FMLA(by element) 2ND FLOW | | | | P | PT | B | X1 | X2 | X3 | X4 | U | | | | |
| FMLA(by element) 1ST FLOW | | | | | P | PT | B | X1 | U | | | | | | |
| FMLA(by element) 2ND FLOW | | | | | | P | PT | B | X1 | X2 | X3 | X4 | U | | |
| FMLA(by element) 1ST FLOW | | | | | | | P | PT | B | X1 | U | | | | |
| FMLA(by element) 2ND FLOW | | | | | | | | P | PT | B | X1 | X2 | X3 | X4 | U |

EXECUTION EXAMPLE (2)

| CYCLE | 1 | 2 | 3 | 4 | 5 | 6 | 7 | 8 | 9 | 10 | 11 |
|---|---|---|---|---|---|---|---|---|---|---|---|
| FMLA | P | PT | B | X1 | X2 | X3 | X4 | U | | | |
| FMLA | | P | PT | B | X1 | X2 | X3 | X4 | U | | |
| FMLA | | | P | PT | B | X1 | X2 | X3 | X4 | U | |
| FMLA | | | | P | PT | B | X1 | X2 | X3 | X4 | U |

EXECUTION EXAMPLE (1)

| CYCLE | 1 | 2 | 3 | 4 | 5 | 6 | 7 | 8 | 9 | 10 | 11 | 12 |
|---|---|---|---|---|---|---|---|---|---|---|---|---|
| FMLA(by element) (ENB=H) | P | PT | B | X1 | X2 | X3 | X4 | X5 | U | | | |
| FMLA(by element) (ENB=H) | | P | PT | B | X1 | X2 | X3 | X4 | X5 | U | | |
| FMLA(by element) (ENB=H) | | | P | PT | B | X1 | X2 | X3 | X4 | X5 | U | |
| FMLA(by element) (ENB=H) | | | | P | PT | B | X1 | X2 | X3 | X4 | X5 | U |

EXECUTION EXAMPLE (2)

| CYCLE | 1 | 2 | 3 | 4 | 5 | 6 | 7 | 8 | 9 | 10 | 11 | 12 |
|---|---|---|---|---|---|---|---|---|---|---|---|---|
| FMLA (ENB=L) | P | PT | B | (X1) | X2 | X3 | X4 | X5 | U | | | |
| FMLA (ENB=L) | | P | PT | B | (X1) | X2 | X3 | X4 | X5 | U | | |
| FMLA (ENB=L) | | | P | PT | B | (X1) | X2 | X3 | X4 | X5 | U | |
| FMLA (ENB=L) | | | | P | PT | B | (X1) | X2 | X3 | X4 | X5 | U |

FIG.10

EXECUTION EXAMPLE (1)

| CYCLE | 1 | 2 | 3 | 4 | 5 | 6 | 7 | 8 | 9 | 10 |
|---|---|---|---|---|---|---|---|---|---|---|
| FMLA(by element) | P | PT | B | BX1 | X1 | X2 | X3 | X4 | U | |
| FMLA | | P | PT | B | (BX1) | X1 | X2 | X3 | X4 | U |

⇧

BX1 CYCLE IS ADDED TO THE SUBSEQUENT FMLA
INSTRUCTION TO AVOID COLLISION

WIHTOUT FEEDBACK LOOP OF BX1-SEL BY FF42 & AND2

| CYCLE | 1 | 2 | 3 | 4 | 5 | 6 | 7 | 8 | 9 |
|---|---|---|---|---|---|---|---|---|---|
| FMLA(by element) | P | PT | B | BX1 | X1 | X2 | X3 | X4 | U |
| FMLA | | P | PT | B | X1 | X2 | X3 | X4 | U |

FMA EXECUTION CYCLES
RESULT IN COLLISION

FIG.11

EXECUTION EXAMPLE (2)

| CYCLE | 1 | 2 | 3 | 4 | 5 | 6 | 7 | 8 | 9 | 10 | 11 | 12 |
|---|---|---|---|---|---|---|---|---|---|---|---|---|
| FMLA(by element) | P | PT | B | BX1 | X1 | X2 | X3 | X4 | U | | | |
| FMLA(by element) | | P | PT | B | BX1 | X1 | X2 | X3 | X4 | U | | |
| FMLA(by element) | | | P | PT | B | BX1 | X1 | X2 | X3 | X4 | U | |
| FMLA(by element) | | | | P | PT | B | BX1 | X1 | X2 | X3 | X4 | U |

EXECUTION EXAMPLE (3)

| CYCLE | 1 | 2 | 3 | 4 | 5 | 6 | 7 | 8 | 9 | 10 | 11 |
|---|---|---|---|---|---|---|---|---|---|---|---|
| FMLA | P | PT | B | X1 | X2 | X3 | X4 | U | | | |
| FMLA | | P | PT | B | X1 | X2 | X3 | X4 | U | | |
| FMLA | | | P | PT | B | X1 | X2 | X3 | X4 | U | |
| FMLA | | | | P | PT | B | X1 | X2 | X3 | X4 | U |

EXECUTION EXAMPLE (4)

| CYCLE | 1 | 2 | 3 | 4 | 5 | 6 | 7 | 8 | 9 | 10 | 11 | 12 |
|---|---|---|---|---|---|---|---|---|---|---|---|---|
| FMLA(by element) | P | PT | B | BX1 | X1 | X2 | X3 | X4 | U | | | |
| FMLA | | P | PT | B | (BX1) | X1 | X2 | X3 | X4 | U | | |
| FMLA(by element) | | | P | PT | B | BX1 | X1 | X2 | X3 | X4 | U | |
| FMLA | | | | P | PT | B | (BX1) | X1 | X2 | X3 | X4 | U |

EXECUTION EXAMPLE (5)

| CYCLE | 1 | 2 | 3 | 4 | 5 | 6 | 7 | 8 | 9 | 10 | 11 | 12 |
|---|---|---|---|---|---|---|---|---|---|---|---|---|
| FMLA(by element) | P | PT | B | BX1 | X1 | X2 | X3 | X4 | U | | | |
| FMLA | | P | PT | B | (BX1) | X1 | X2 | X3 | X4 | U | | |
| FMLA | | | P | PT | B | (BX1) | X1 | X2 | X3 | X4 | U | |
| FREE | | | | | | | | | | | | |
| FMLA | | | | | P | PT | B | X1 | X2 | X3 | X4 | U |

FIG.14

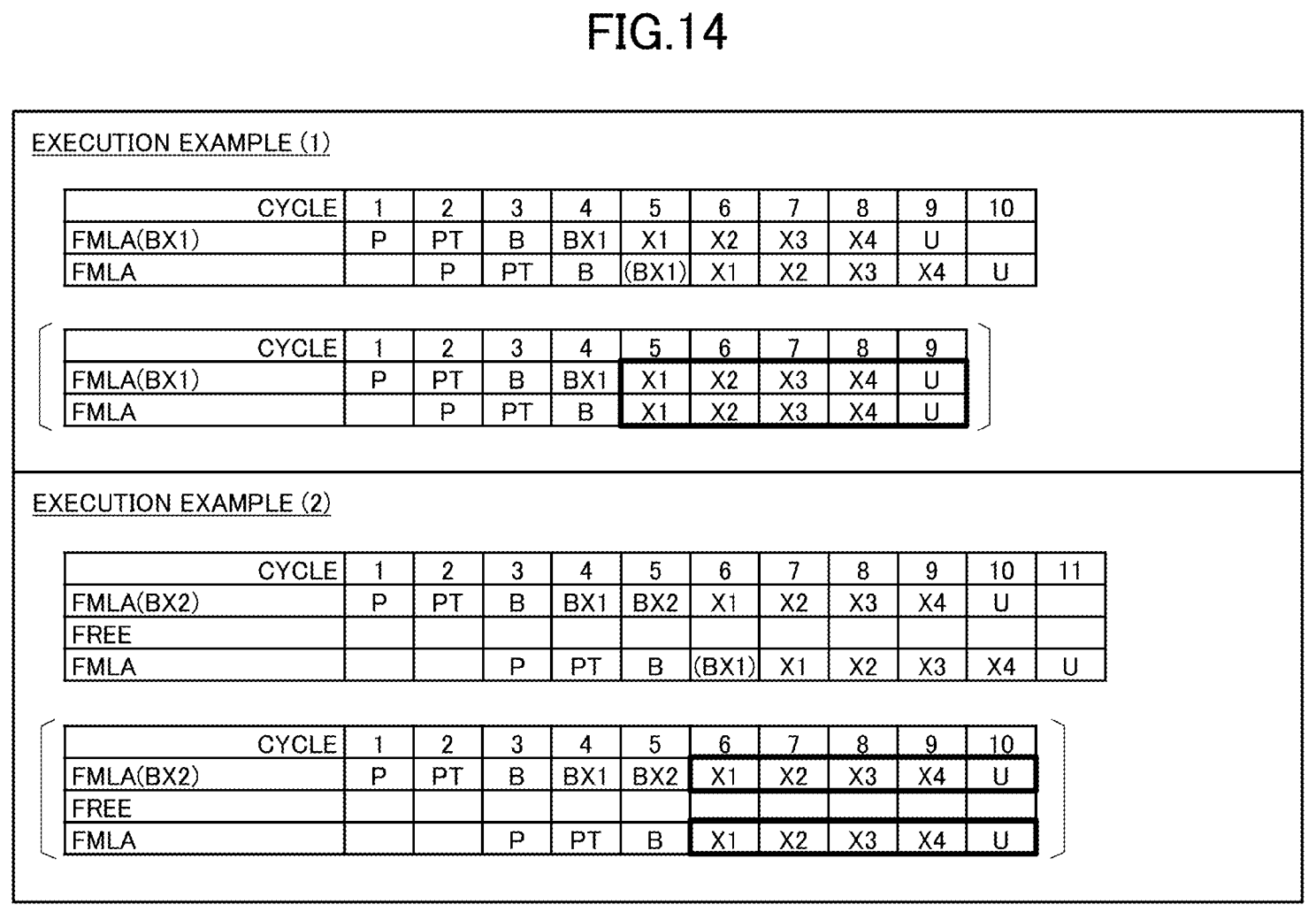

EXECUTION EXAMPLE (1)

| CYCLE | 1 | 2 | 3 | 4 | 5 | 6 | 7 | 8 | 9 | 10 |
|---|---|---|---|---|---|---|---|---|---|---|
| FMLA(BX1) | P | PT | B | BX1 | X1 | X2 | X3 | X4 | U | |
| FMLA | | P | PT | B | (BX1) | X1 | X2 | X3 | X4 | U |

| CYCLE | 1 | 2 | 3 | 4 | 5 | 6 | 7 | 8 | 9 |
|---|---|---|---|---|---|---|---|---|---|
| FMLA(BX1) | P | PT | B | BX1 | X1 | X2 | X3 | X4 | U |
| FMLA | | P | PT | B | X1 | X2 | X3 | X4 | U |

EXECUTION EXAMPLE (2)

| CYCLE | 1 | 2 | 3 | 4 | 5 | 6 | 7 | 8 | 9 | 10 | 11 |
|---|---|---|---|---|---|---|---|---|---|---|---|
| FMLA(BX2) | P | PT | B | BX1 | BX2 | X1 | X2 | X3 | X4 | U | |
| FREE | | | | | | | | | | | |
| FMLA | | | P | PT | B | (BX1) | X1 | X2 | X3 | X4 | U |

| CYCLE | 1 | 2 | 3 | 4 | 5 | 6 | 7 | 8 | 9 | 10 |
|---|---|---|---|---|---|---|---|---|---|---|
| FMLA(BX2) | P | PT | B | BX1 | BX2 | X1 | X2 | X3 | X4 | U |
| FREE | | | | | | | | | | |
| FMLA | | | P | PT | B | X1 | X2 | X3 | X4 | U |

FIG.15

EXECUTION EXAMPLE (3)

| CYCLE | 1 | 2 | 3 | 4 | 5 | 6 | 7 | 8 | 9 | 10 | 11 |
|---|---|---|---|---|---|---|---|---|---|---|---|
| FMLA(BX2) | P | PT | B | BX1 | BX2 | X1 | X2 | X3 | X4 | U | |
| FMLA(BX1) | | P | PT | B | BX1 | (BX2) | X1 | X2 | X3 | X4 | U |

| CYCLE | 1 | 2 | 3 | 4 | 5 | 6 | 7 | 8 | 9 | 10 |
|---|---|---|---|---|---|---|---|---|---|---|
| FMLA(BX2) | P | PT | B | BX1 | BX2 | X1 | X2 | X3 | X4 | U |
| FMLA(BX1) | P | P | PT | B | BX1 | X1 | X2 | X3 | X4 | U |

EXECUTION EXAMPLE (4)

| CYCLE | 1 | 2 | 3 | 4 | 5 | 6 | 7 | 8 | 9 | 10 | 11 | 12 |
|---|---|---|---|---|---|---|---|---|---|---|---|---|
| FMLA(BX2) | P | PT | B | BX1 | BX2 | X1 | X2 | X3 | X4 | U | | |
| FMLA(BX2) | | P | PT | B | BX1 | BX2 | X1 | X2 | X3 | X4 | U | |
| FMLA | | | P | PT | B | (BX1) | (BX2) | X1 | X2 | X3 | X4 | U |

| CYCLE | 1 | 2 | 3 | 4 | 5 | 6 | 7 | 8 | 9 | 10 | 11 | 12 |
|---|---|---|---|---|---|---|---|---|---|---|---|---|
| FMLA(BX2) | P | PT | B | BX1 | BX2 | X1 | X2 | X3 | X4 | U | | |
| FMLA(BX2) | | P | PT | B | BX1 | BX2 | X1 | X2 | X3 | X4 | U | |
| FMLA | | | P | PT | B | (BX1) | X1 | X2 | X3 | X4 | U | U |

| CYCLE | 1 | 2 | 3 | 4 | 5 | 6 | 7 | 8 | 9 | 10 | 11 | 12 |
|---|---|---|---|---|---|---|---|---|---|---|---|---|
| FMLA(BX2) | P | PT | B | BX1 | BX2 | X1 | X2 | X3 | X4 | U | | |
| FMLA(BX2) | | P | PT | B | BX1 | BX2 | X1 | X2 | X3 | X4 | U | |
| FMLA | | | P | PT | B | (BX1) | X1 | X2 | X3 | X4 | U | U |

FIG.16

EXECUTION EXAMPLE (5)

| CYCLE | 1 | 2 | 3 | 4 | 5 | 6 | 7 | 8 | 9 | 10 | 11 | 12 | 13 |
|---|---|---|---|---|---|---|---|---|---|---|---|---|---|
| FML(BX2) | P | PT | B | BX1 | BX2 | X1 | X2 | X3 | X4 | U | | | |
| FML(BX2) | | P | PT | B | BX1 | BX2 | X1 | X2 | X3 | X4 | U | | |
| FMLA | | | P | PT | B | (BX1) | (BX2) | X1 | X2 | X3 | X4 | U | |
| FREE | | | | | | | | | | | | | |
| FMLA | | | | | P | PT | B | (BX1) | X1 | X2 | X3 | X4 | U |

EXECUTION EXAMPLE (6)

| CYCLE | 1 | 2 | 3 | 4 | 5 | 6 | 7 | 8 | 9 | 10 | 11 | 12 | 13 |
|---|---|---|---|---|---|---|---|---|---|---|---|---|---|
| FML(BX2) | P | PT | B | BX1 | BX2 | X1 | X2 | X3 | X4 | U | | | |
| FML(BX2) | | P | PT | B | BX1 | BX2 | X1 | X2 | X3 | X4 | U | | |
| FMLA | | | P | PT | B | (BX1) | (BX2) | X1 | X2 | X3 | X4 | U | |
| FREE | | | | | | | | | | | | | |
| FREE | | | | | | | | | | | | | |
| FMLA | | | | | | P | PT | B | X1 | X2 | X3 | X4 | U |

PROCESSOR SELECTIVELY EXECUTING FIRST INSTRUCTION USING NON-PRE-PROCESSED DATA OR SECOND INSTRUCTION USING PRE-PROCESSED DATA

CROSS-REFERENCE TO RELATED APPLICATIONS

The present application is based upon and claims the benefit of priority from the prior Japanese Patent Application No. 2022-163027 filed on Oct. 11, 2022, with the Japanese Patent Office, the entire contents of which are incorporated herein by reference.

FIELD

The disclosure discussed herein relates to a processor.

BACKGROUND

There is a known technique to operate a group of operators with a different number of operation cycles in parallel by sharing a register by controlling the issuance of an operation instruction following a preceding operation instruction with respect to the operator, based on information indicating whether the source operands are available (See, e.g., Patent Document 1).

RELATED-ART DOCUMENT

Patent Document

[Patent Document 1] Japanese Laid-Open Patent Application No. 2000-181705

For example, when an operation of data and an operation of pre-processed data are executed by a single operator, a pipeline is divided into a first flow including a pre-processor that executes pre-processing on data and a second flow including an operator that executes operation on data. Then, the operation on data subject to pre-processing is executed by combining the first flow and the second flow, and the operation on data that is not subject to pre-processing is executed using only the second flow. Alternatively, when the pipeline includes a pre-processor and an operator connected in series, the operation on data that is not subject to pre-processing is implemented by disabling the processing of the pre-processor.

However, in the pipeline including the first flow and the second flow, the operation on the data subject to pre-processing is executed only once in two cycles, so that the number of instruction processes per cycle, IPC (Instructions per Cycle), is reduced. Also, in a pipeline that includes a pre-processor and an operator, since data passes through the pre-processor during operation on data that is not subject to pre-processing, an extra cycle is added and the operation latency increases.

SUMMARY

According to one aspect of the embodiments, a processor includes an operation executer configured to execute pipeline processing of an operation instruction, wherein the operation executer includes
a first register configured to hold data to be used for an operation;

a pre-processor configured to pre-process data held in the first register;
a second register configured to hold the data pre-processed by the pre-processor;
an operator configured to execute an operation on the data held in the first register or the data held in the second register; and
a selector configured to connect an output of the first register or an output of the second register to an input of the operator.

The object and advantages of the embodiment will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 1 is a block diagram illustrating an example of a main part of a processor according to an embodiment.

FIG. 3 is a timing diagram illustrating an example of pipeline operation when the processor in FIG. 1 executes the multiply-add operation instruction illustrated in FIG. 2.

FIG. 4 is a block diagram illustrating an example of a main part of another processor.

FIG. 5 is a timing diagram illustrating an example of pipeline operation when the processor in FIG. 4 executes the multiply-add operation instruction illustrated in FIG. 2.

FIG. 6 is a block diagram illustrating an example of a main part of yet another processor.

FIG. 7 is a timing diagram illustrating an example of pipeline operation when the processor in FIG. 6 executes the multiply-add operation instruction illustrated in FIG. 2.

FIG. 10 is a timing diagram illustrating an example of pipeline operation when the operation executer in FIG. 9 executes the multiply-add operation instruction illustrated in FIG. 2.

FIG. 11 is a timing diagram illustrating another example of pipeline operation when the operation executer in FIG. 9 executes the multiply-add operation instruction illustrated in FIG. 2.

FIG. 14 is a timing diagram illustrating an example of pipeline operation when the operation executer in FIG. 12 and FIG. 13 executes a multiply-add operation instruction.

FIG. 15 is a timing diagram illustrating another example of pipeline operation when the operation executer in FIG. 12 and FIG. 13 executes a multiply-add operation instruction.

FIG. 16 is a timing diagram illustrating still another example of pipeline operation when the operation executer in FIG. 12 and FIG. 13 executes a multiply-add operation instruction.

DESCRIPTION OF EMBODIMENTS

Figure 2:
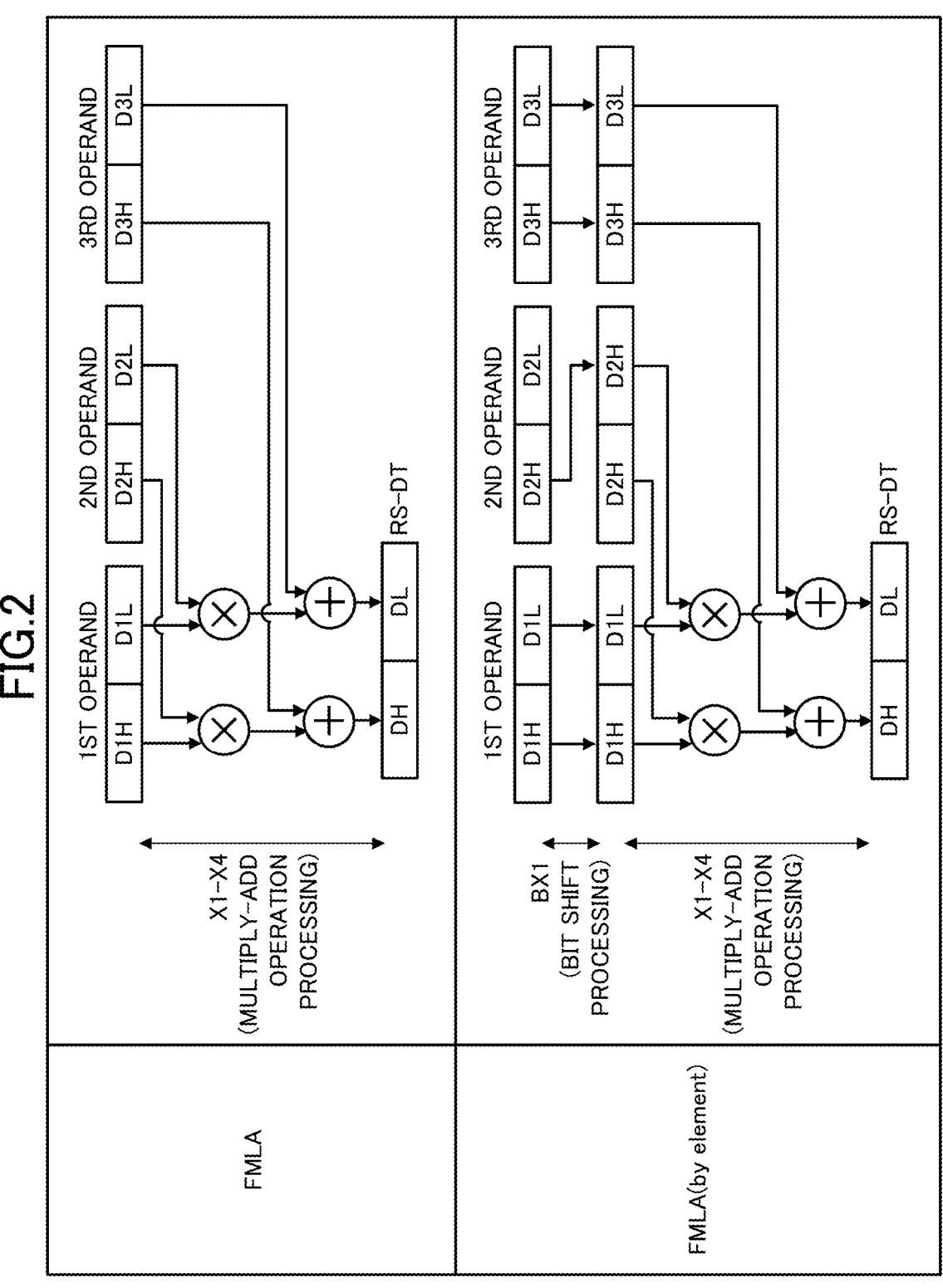
FIG. 2 is an explanatory diagram illustrating an example of a multiply-add operation instruction executed by the processor in FIG. 1.

Accordingly, one aspect of embodiments is to improve the processing performance of operation instructions that execute pre-processing while preventing an increase in operation latency of operation instructions that do not execute pre-processing.

The embodiments will be described below with reference to the accompanying drawings. Below, a signal line on which a signal is carried is provided with the same sign as a signal name. Although not particularly specified, a processor described below is a superscalar processor that executes instructions in parallel by pipeline processing. Moreover, the processor described below can execute SIMD (Single Instruction Multiple Data) operation that executes multiple data operations in parallel with a single instruction. The processor described below may be a scalar processor.

Figure 1:
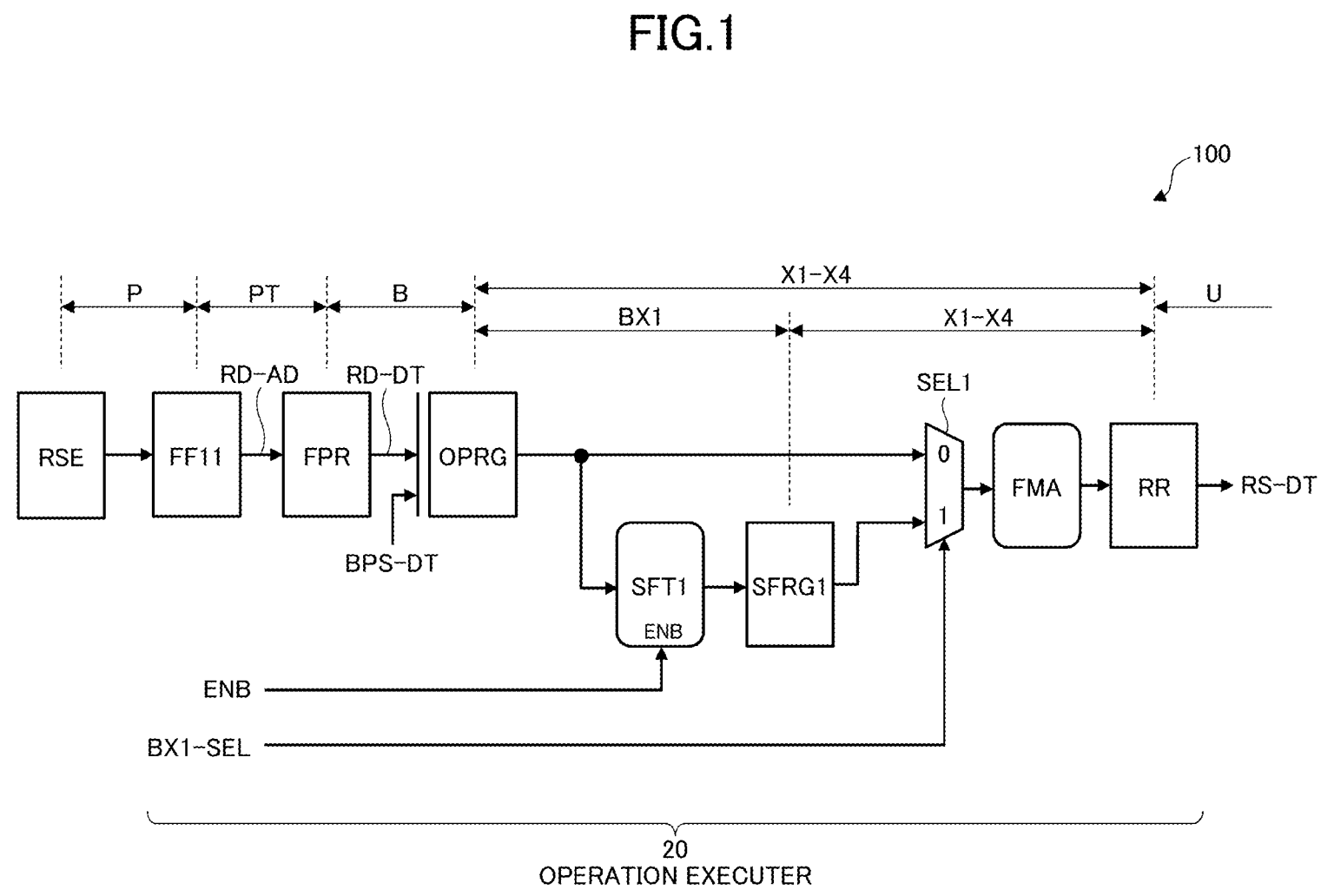

FIG. 1 is a diagram illustrating an example of a main part of a processor according to an embodiment. A processor 100 illustrated in FIG. 1 has an operation executer 20 configured to execute pipeline processing of operation instructions. In FIG. 1, descriptions of a clock signal and a clock terminal are omitted. For example, the operation executer 20 can execute an FMLA instruction (FMLA represents "Floating-point fused Multiply-Add") and an FMLA (by element) instruction defined in the ARM's instruction set architecture. The FMLA instruction is an example of a first operation instruction and the FMLA (by element) instruction is an example of a second operation instruction.

The operation executer 20 includes a register FPR (Floating Point Register), an operand register OPRG, a shift operator SFT1, a register SFRG1, a selector SEL1, an FMA (Floating Multiply Add) operator, and a result register RR. The operation executer 20 also includes a plurality of flip-flops FFs (only FF11 is illustrated in FIG. 1) that separate the stages of the pipeline.

The operand register OPRG is an example of a first register configured to hold data to be used for an operation. The shift operator SFT1 is an example of a pre-processor configured to pre-process data held in the operand register OPRG. The register SFRG1 is an example of a second register configured to hold data pre-processed by the shift operator SFT1. The selector SEL1 is an example of a first selector configured to select data held in the operand register OPRG or data held in the register SFRG1. The FMA operator is an example of an operator configured to execute an operation on data selected by the selector SEL1.

Symbols P, PT, B, BX1, X1 to X4, and U in FIG. 1 indicate stages in a pipeline for floating-point operations. Hereafter, each stage is also referred to as a cycle. A P cycle is a cycle in which a reservation station RSE (Reservation Station for Execution) installed in the processor 100 inputs an operation instruction to the operation executer 20. A PT cycle is a cycle in which the operation instruction including a read address RD-AD input from the reservation station RSE is output to the register FPR. A B cycle is a cycle in which the data to be used for an operation is determined.

A BX1 cycle is a cycle in which pre-processing is executed by an operation instruction that executes pre-processing before an operation. For example, in the execution of the FMLA (by element) instruction, which is one of the operation instructions that executes pre-processing before an operation, shift-processing is executed as the pre-processing before a multiply-add operation. The X1 to X4 (X1, X2, X3, and X4) cycles are each a cycle in which a multiply-add operation is executed. A U cycle is a cycle in which result data RS-DT (i.e., the result of the operation) is written into the register FPR.

A flip-flop FF11, the register FPR, the operand register OPRG, the selector SEL1, the FMA operator, and the result register RR are connected in series to an output of the reservation station RSE. The shift operator SFT1 and the register SFRG1 are connected in series between the operand register OPRG and the selector SEL1. The reservation station RSE accumulates operation instructions and speculatively issues the accumulated operation instructions out-of-order to the operation executer 20 in an executable order.

The register FPR outputs data RD-DT (floating point number data) held in a storage area indicated by the address RD-AD received from the reservation station RSE via the flip-flop FF11 to the operand register OPRG. The operand register OPRG outputs the data RD-DT from the register FPR or bypass data BPS-DT from the operator installed in the operation executer 20 to the shift operator SFT1 and an input terminal 0 of the selector SEL1. For example, in the multiply-add operation, three types of operands are held in the operand register OPRG.

When executing the FMLA (by element) instruction, the shift operator SFT1 executes the shift operation of the specified operand data in the BX1 cycle, and stores the execution result of the shift operation in the register SFRG1. The shift operator SFT1 stores the operand data for which no shift operation is specified in the register SFRG1 as it is.

The shift operator SFT1 selects the operand data to be shifted according to an enable signal ENB received at an enable terminal ENB. Since there is no BX1 cycle when the FMLA instruction is executed, the shift operator SFT1 is disabled by the enable signal ENB. For example, the enable terminal ENB may be provided with as many as the number of bits of the code identifying the operands used in the operation or as many as the number of operands used in the operation.

The selector SEL1 supplies the FMA operator with output data from the operand register OPRG received at the input terminal 0 or output data from the register SFRG1 received at an input terminal 1, according to a logical value of the selection signal BX1-SEL. For example, the selector SEL1 selects the output of the register SFRG1 in the X1 cycle of the FMLA (by element) instruction and selects the output of the operand register OPRG in the X1 cycle of the operation instruction other than the FMLA (by element) instruction.

The FMA operator executes the multiply-add operation of the operand data received from the selector SEL1 and stores the execution result in the result register RR. For example, the FMA operator has four stages of flip-flops inside, executes a multiply-add operation over four cycles from X1 cycle to X4 cycle, and stores the execution result in the result register RR.

When executing an FMLA instruction, the operation executer 20 executes a multiply-add operation using the data in the operand register OPRG as it is. Thus, the output of the data from the operand register OPRG is in the X1 cycle, and the pipeline when executing the FMLA instruction includes P, PT, B, X1, X2, X3, X4, and U cycles.

On the other hand, when executing the FMLA (by element) instruction, the operation executer 20 executes pre-processing before the multiply-add operation. Therefore, the output of the data from the operand register OPRG is in the BX1 cycle, and the output of the data from the register SFRG1 is in the X1 cycle. Therefore, the pipeline when executing the FMLA (by element) includes P, PT, B, BX1, X1, X2, X3, X4, and U cycles.

It should be noted that the operation instruction that does not execute pre-processing may be other than the FMLA instruction, and the operation instruction configured to execute pre-processing may be other than the FMLA (by element) instruction. The operation executer 20 may have an operator other than an FMA operator. The pre-processor SFT1 may execute pre-processing other than shift-processing.

FIG. 2 is a diagram illustrating an operation example of a multiply-add operation instruction executed by the processor 100 in FIG. 1. In FIG. 2, the FMLA instruction and the FMLA (by element) instruction are illustrated. The FMLA instruction is a normal multiply-add operation instruction for floating-point numbers, which is, for example, capable of simultaneously executing operations between high-order bit groups and operations between low-order bit groups (2 SIMD operation). The FMLA (by element) instruction is an instruction to execute a multiply-add operation on pre-processed data. Although not particularly specified, each of the operands is 128 bits, and the high-order bit group and low-order bit group are 64 bits each.

In the FMLA instruction, first, multiplication of the high-order bit groups D1H and D2H and multiplication of the low-order bit groups D1L and D2L are executed using the first and second operands. Then, the multiplication results of the high-order bit groups and a high-order bit group D3H of the third operand are added together, the multiplication results of the low-order bit groups and a low-order bit group D3L of the third operand are added together, and 2 pieces of 64-bit data DH and DL are output as result data RS-DT.

In the FMLA (by element) instruction, in the BX1 cycle, the high-order bit group D2H of the second operand is shifted to the right, so that the high-order bit group D2H is held in both the high-order bit group and low-order bit group of the second operand. In the X1 to X4 cycles after the BX1 cycle, the multiply-add operation is executed as in the FMLA instruction. In the FMLA (by element) instruction, it is possible to specify which of the high-order bit group and low-order bit group of the second operand is used for multiplication.

FIG. 3 is a diagram illustrating an example of pipeline operation when a processor 100 in FIG. 1 executes the multiply-add operation instruction illustrated in FIG. 2. In the execution example (1), the RSE repeatedly issues multiple FMLA (by element) instructions. The processor 100 executes 9 stages from the P cycle to the U cycle without duplication while shifting the FMLA (by element) instructions by one cycle. This enables the processor 100 to complete one FMLA (by element) instruction per cycle. The 4 FMLA (by element) instructions are executed over 12 cycles. For example, a cycle is a clock cycle.

In the execution example (2), the RSE repeatedly issues multiple FMLA instructions. The processor 100 executes 8 stages from the P cycle to the U cycle without duplication while shifting the FMLA instructions by one cycle. This enables the processor 100 to complete one FMLA instruction per cycle. The four FMLA instructions are executed over 11 cycles.

Figure 4:
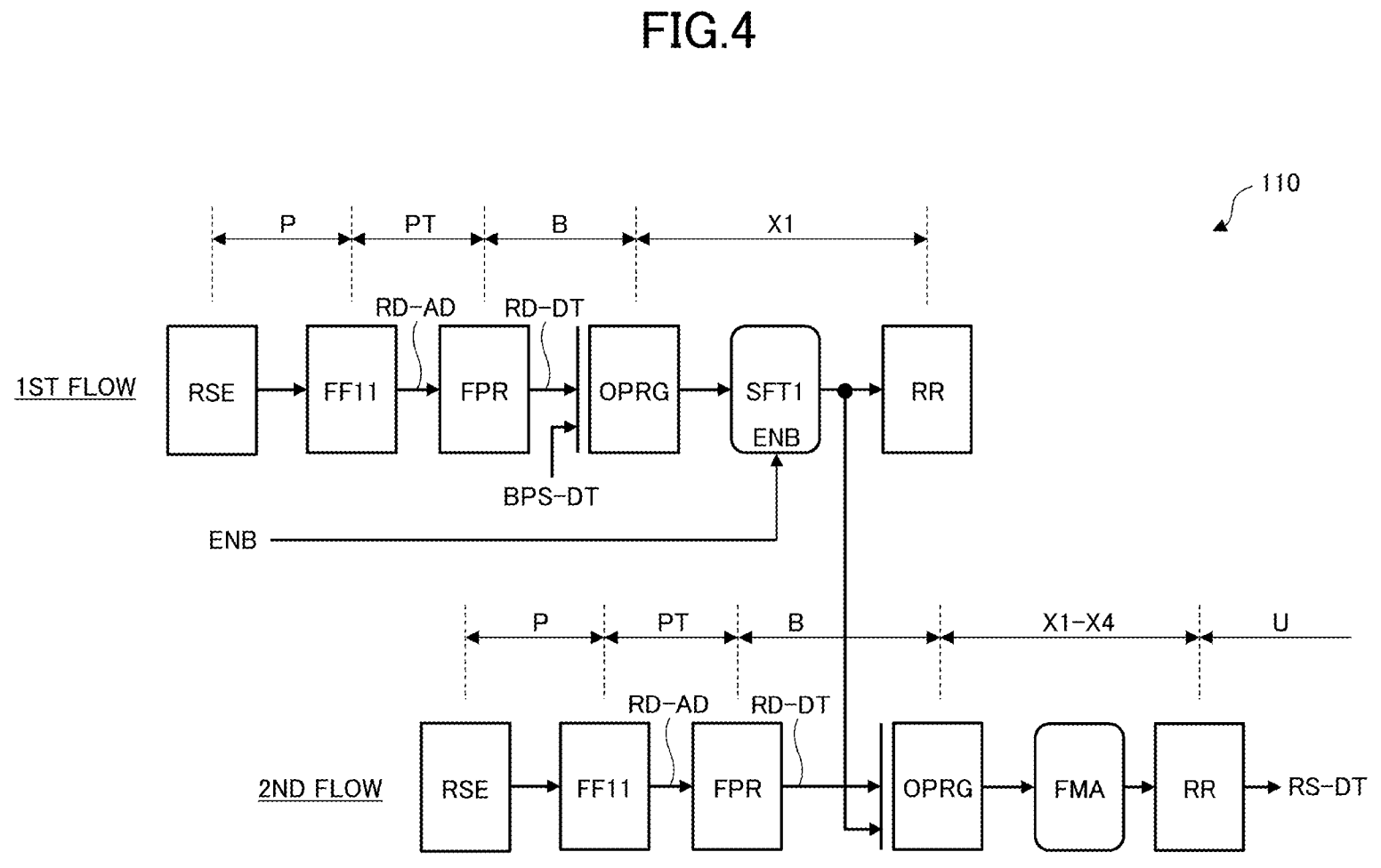

FIG. 4 is a diagram illustrating an example of a main part of another processor. Elements similar to those in FIG. 1 are denoted by the same symbols, and detailed descriptions are omitted. In FIG. 4, an example of a floating-point pipeline that executes the FMLA (by element) instruction is illustrated. A processor 110 illustrated in FIG. 4 executes the FMLA (by element) instruction separately in a first flow and a second flow. The first flow is a pre-processing flow in which the high-order bit group D2H of the second operand is shifted by the shift operator SFT1, and the shift-processing is executed in the X1 cycle.

The second flow is a multiply-add operation execution flow using the shift-processing result of the first flow, which is a flow for executing an FMLA instruction. Note that FIG.

4 is a diagram illustrating an example in which propagation of the shift-processing result from the first flow to the second flow is executed at the shortest timing when the FMLA (by element) instruction is executed. For this reason, the output of the shift operator SFT1 of the first flow is directly connected to the operand register OPRG of the second flow.

When there is a gap between the execution of the first flow and the execution of the second flow, the result of the shift operation of the first flow is written into the register FPR via the result register RR. In this case, the second flow executes a multiply-add operation using the data RD-DT from the register FPR.

FIG. 5 is a diagram illustrating an example of pipeline operation when the processor 110 in FIG. 4 executes the multiply-add operation instruction illustrated in FIG. 2.

In the execution example (1), the RSE repeatedly issues the first flow and the second flow of the FMLA (by element) instructions alternately. Since the processor 110 in FIG. 4 splits the FMLA (by element) instruction into two flows for execution, the processor executes the floating-point pipeline twice, and the completion of one FMLA (by element) instruction occurs once every two cycles.

This reduces the efficiency of the IPC, which is half the IPC of the normal FMLA instruction, compared to that of FIG. 3. The processor 110 also executes four FMLA (by element) instructions over 15 cycles, which is 3 cycles more than the number of cycles executed in FIG. 3.

In other words, the processor 100 in FIG. 1 can reduce the execution cycles of the four FMLA (by element) instructions by three cycles compared to the processor 110 in FIG. 4. Also, the processor 100 in FIG. 1 can execute the FMLA (by element) instruction per cycle by a single flow without reducing the efficiency of IPC. For example, in computation processing such as deep learning, the more FMLA (by element) instructions are executed, the greater the effect of reducing computation time.

In the execution example (2), the RSE repeatedly issues multiple FMLA instructions. The operation of the pipeline when the processor 110 executes FMLA instructions is the same as the operation of the pipeline when the processor 100 executes FMLA instructions (execution example (2) in FIG. 3).

Figure 6:
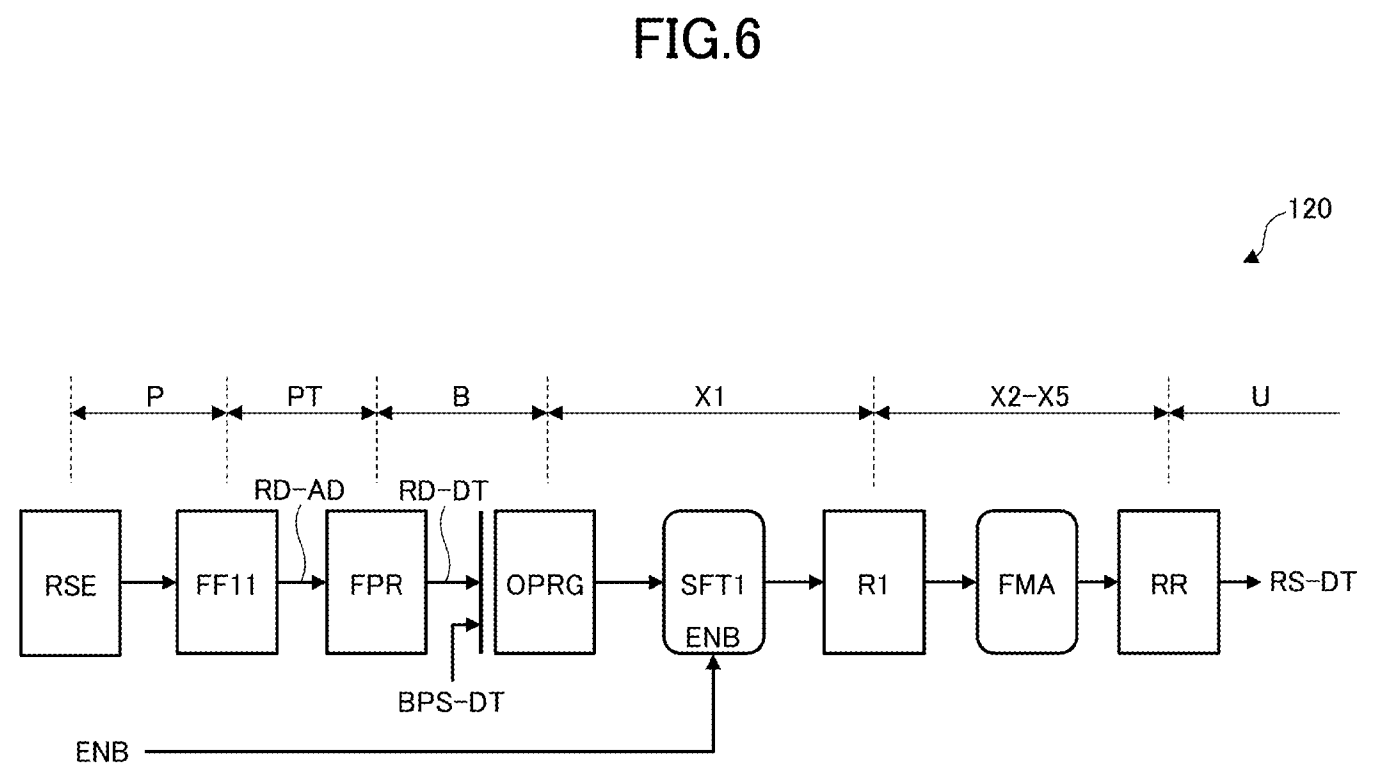

FIG. 6 is a diagram illustrating an example of a main part of yet another processor. Elements similar to those in FIG. 1 are denoted by the same symbols, and detailed descriptions are omitted. A processor 120 illustrated in FIG. 6 has a floating-point pipeline commonly used for FMLA (by element) and FMLA instructions. That is, the processor 120 executes FMLA (by element) instructions and FMLA instructions using a single flow.

The processor 120 includes a flip-flop FF11, register FPR, operand register OPRG, shift operator SFT1, register R1, FMA operator, and result register RR connected in series to an output of the reservation station RSE.

When executing the FMLA (by element) instruction, the processor 120 enables an enable signal ENB corresponding to operand data to be shifted and disables an enable signal ENB corresponding to other operand data. Then, the processor 120 executes shift-processing (pre-processing) in the X1 cycle and a multiply-add operation in the X2 to X5 cycles.

When executing the FMLA instruction, the processor 120 disables shift-processing of all the operand data using the enable signal ENB. In this case, the shift operator SFT1 does not execute shift-processing (pre-processing), but the shift operator SFT1 consumes the X1 cycle to propagate the operand data to the register R1. Therefore, the number of cycles required to execute the FMLA instruction is the same as the number of cycles required to execute the FMLA (by element) instruction.

FIG. 7 is a diagram illustrating an example of pipeline operation when the processor in FIG. 6 executes a multiply-add operation instruction illustrated in FIG. 2. In the execution example (1), the RSE repeatedly issues multiple FMLA (by element) instructions as in the execution example (1) in FIG. 3. The processor 120 sets an enable signal ENB corresponding to an operand to be shifted to enabled (e.g., high-level H). In the execution example (1), since the FMLA (by element) instructions are executed by a single flow, IPC deterioration is prevented.

In the execution example (2), the RSE repeatedly issues multiple FMLA instructions. The processor 120 sets the enable signals ENB corresponding to all the operands to disabled (e.g., low-level L). In the FMLA instructions, the shift operator SFT1 passes the operand data in the X1 cycle, so the operation latency, which is the number of cycles required to execute one FMLA instruction, becomes 9 cycles, which is one cycle more than that of the execution example (2) in FIG. 3. The X1 cycle in which shift-processing is not executed is bracketed. Thus, in FIG. 7, since the FMLA (by element) instruction is executed by a single flow, IPC deterioration is prevented, but the execution latency of the FMLA instruction increases, thereby reducing the execution performance of the FMLA instruction.

As described above, in this embodiment, the pipeline of the operation executer 20 inserts a BX cycle for executing shift-processing by the shift operator SFT1 when executing the FMLA (by element) instruction, and does not insert the BX cycle when executing the FMLA instruction. Thus, the FMLA (by element) instruction and the FMLA instruction can each be executed in a single flow using a single pipeline, and can be completed on a per cycle basis. In addition, since the BX cycle is not inserted when the FMLA instruction is executed, an increase in the execution latency of the FMLA instruction can be prevented, and a decrease in the execution performance of the FMLA instruction can be prevented. As a result, an increase in the operation latency of the FMLA instruction that does not execute pre-processing can be prevented, while the processing performance of the FMLA (by element) instruction that executes pre-processing can be improved.

Figure 8:
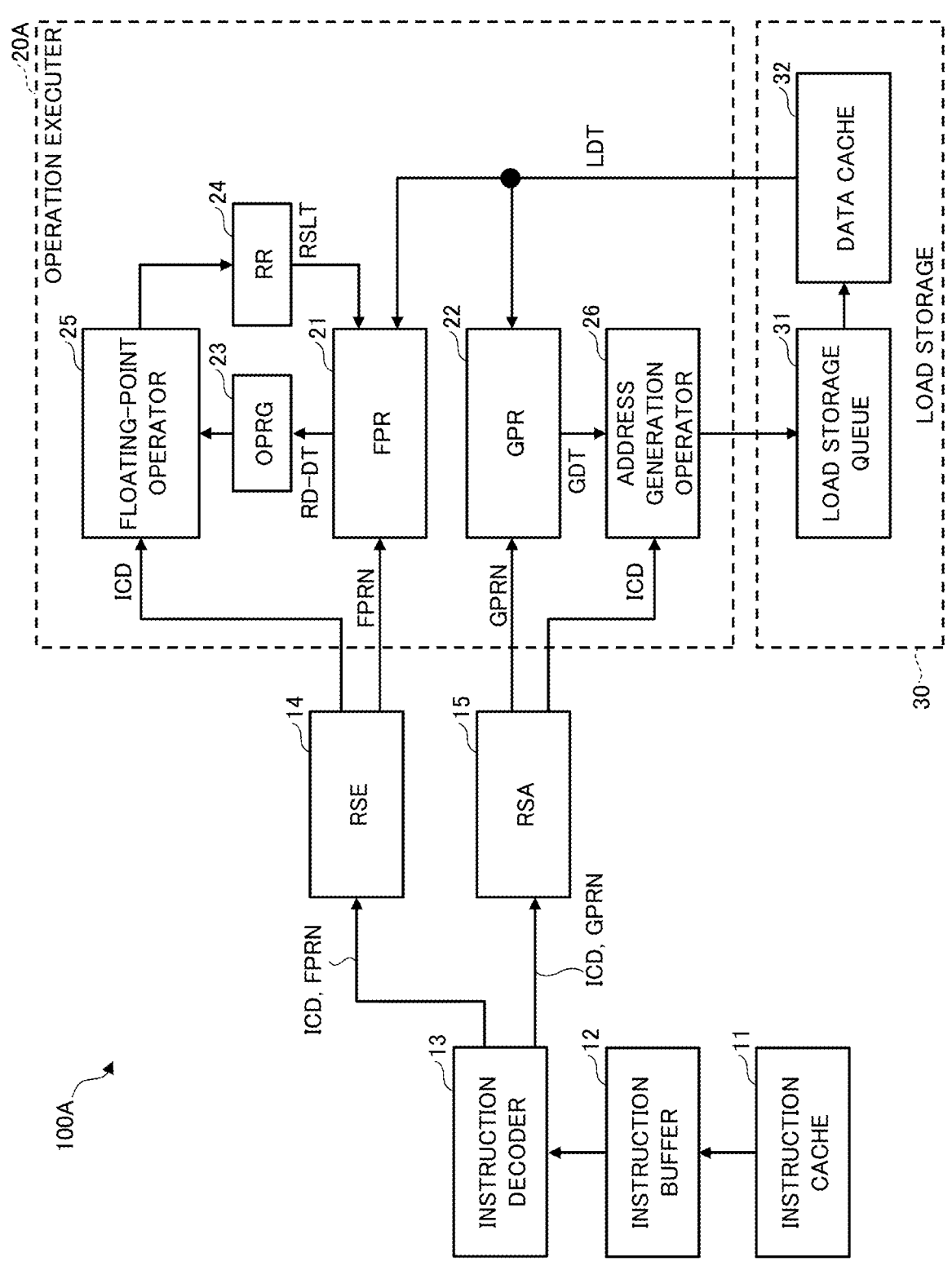
FIG. 8 is a block diagram illustrating an example of a processor according to another embodiment.

FIG. 8 is a diagram illustrating an example of a processor in another embodiment. In FIG. 8, a core portion of the processor is illustrated. A processor 100A illustrated in FIG. 8 has an instruction cache 11, an instruction buffer 12, an instruction decoder 13, a reservation station 14 (RSE), a reservation station 15 (RSA for Address), an operation executer 20A, and a load storage 30. Hereafter, the reservation stations 14 and 15 are also referred to as RSE and RSA, respectively.

The operation executer 20 has a register 21 (FPR), a register 22 (GPR: General Purpose Register), an operand register 23 (OPRG), a result register 24 (RR), a floating-point operator 25, and an address generation operator 26. In the following, the registers 21 and 22, the operand register 23, and the result register 24 are also referred to as a register FPR, a register GPR, an operand register OPRG, and a result register RR, respectively.

The instruction cache 11 holds various instructions such as operation instructions and memory access instructions. The instruction buffer 12 stores instructions read from the instruction cache 11 and sequentially outputs the stored instructions to the instruction decoder 13. The instruction decoder 13 executes decoding processing to interpret an instruction received from the instruction buffer 12, and generates an instruction code ICD indicating an instruction to cause the operation executer to execute an operation and registration numbers FPRN and GPRN indicating registers used to execute the operation. When the generated instruction code ICD is a floating-point operation instruction, the instruction decoder 13 outputs the instruction code ICD and registration numbers FPRN to the RSE. When the generated instruction code ICD is a memory access instruction, the instruction decoder 13 outputs the instruction code ICD and registration numbers GPRN to the RSA.

The RSE accumulates operation instructions and speculatively issues the accumulated operation instructions out-of-order to the operation executer 20A in an executable order. The output of the RSE is connected to the register FPR and the floating-point operator 25. The RSE then outputs the instruction code ICD to the floating-point operator 25 to execute the floating-point operation instruction and outputs the registration number FPRN to the register FPR.

The RSA accumulates memory access instructions, such as load instructions or store instructions, and speculatively issues the accumulated operation instructions out-of-order to the operation executer 20A in an executable order. The output of the RSA accumulating memory access instructions is connected to the register GPR and an address generation operator 26. Then, the RSA outputs an instruction code ICD for executing memory access instructions to an address generation operator 26 and a registration number GPRN to the register GPR.

The RSE may be connected to a fixed-point operator (not illustrated) and the register GPR. In addition, instead of the RSE and RSA, a reservation station integrating RSE and RSA functions may be provided.

Upon receiving the memory access instruction from the RSA, the address generation operator 26 reads the data GDT from the register GPR with reference to the register GPR, and generates an access address by executing addition processing or the like of the read data GDT. The address generation operator 26 outputs the generated access address to the load storage 30.

The load storage 30 accumulates the access addresses received from the address generation operator 26 in a load store queue 31 and accesses a data cache 32 using the accumulated access addresses sequentially. When the memory access instruction is a load instruction, load data LDT is read from the data cache 32 and output to the operation executer 20A. The load data LDT is written to the register FPR in the case of floating-point data and to the register GPR in the case of fixed-point data.

Upon receiving the floating-point operation instruction from the RSE, the floating-point operator 25 reads the data RD-DT from the register FPR with reference to the register FPR, and receives the read data RD-DT via the operand register OPRG. The floating-point operator 25 executes the floating-point operation using the received data and writes the operation result RSLT to the register FPR via the result register RR.

Figure 9:
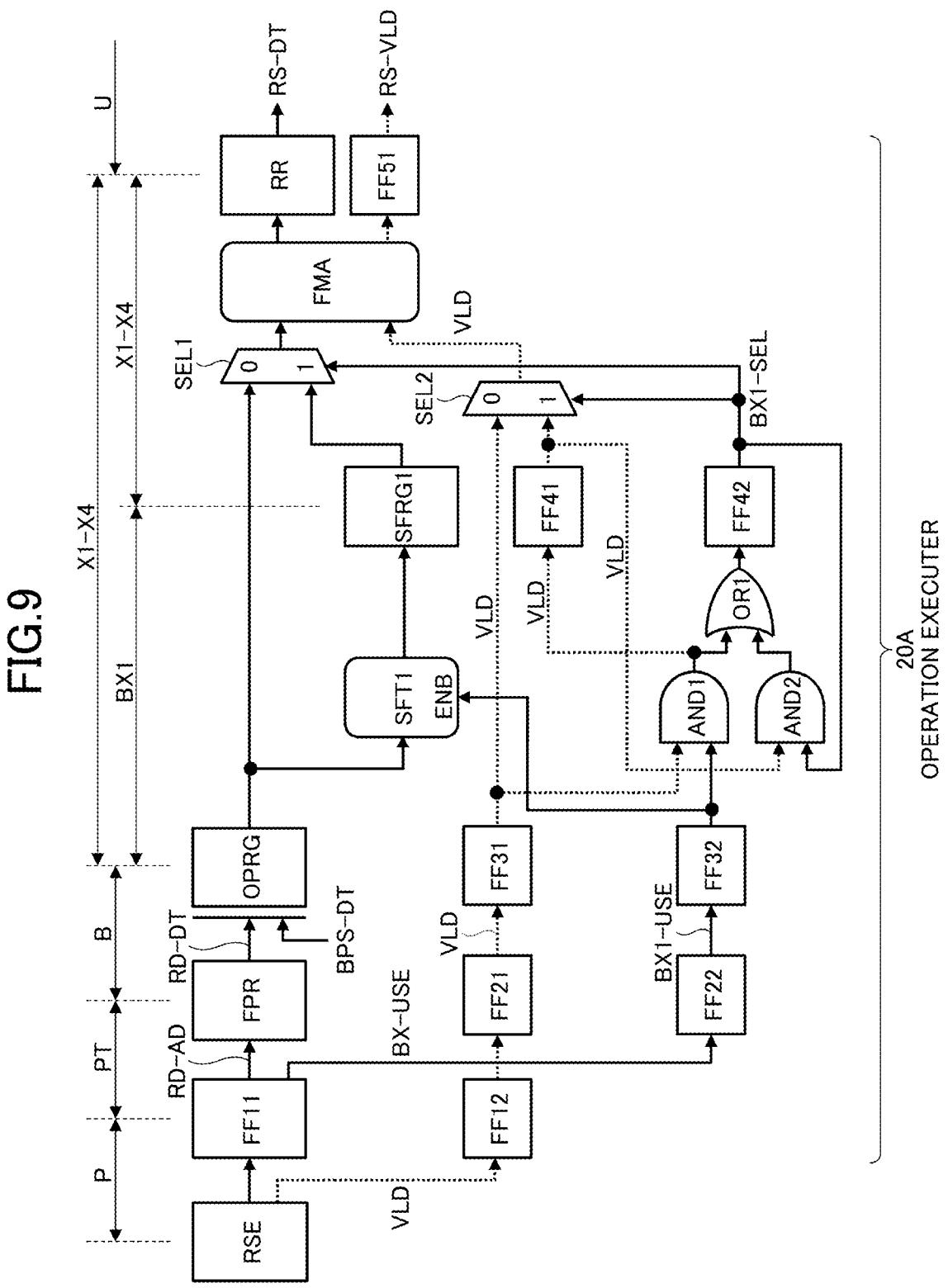
FIG. 9 is a block diagram illustrating an example of a main part of an operation executer in FIG. 8.

FIG. 9 is a block diagram illustrating an example of a main part of the operation executer 20A in FIG. 8. Elements similar to those in FIG. 1 are denoted by the same symbols, and detailed descriptions are omitted. Descriptions of clock signals and clock terminals are also omitted in FIG. 9. The operation executer 20A includes a register FPR, an operand register OPRG, a shift operator SFT1, a register SFRG1, a selector SEL1, an FMA operator, a result register RR, AND circuits AND1 and AND2, an OR circuit OR1, and a selector SEL2.

The AND circuit AND1, the AND circuit AND2, and the OR circuit OR1 each have two inputs. The AND circuit AND1, the AND circuit AND2, the OR circuit OR1, and the FF42 are examples of a selection signal generator configured to generate a selection signal BX1-SEL. The AND circuit AND2 and the FF42 are examples of a holding unit that holds a selection signal BX1-SEL.

Moreover, the operation executer 20A includes a plurality of flip-flops FFs (FF11, FF12, FF21, FF22, FF31, FF32, FF41, FF42, FF51, etc.) that delimit the stages of the pipeline. In the following, the flip-flops FFs are described only by the symbols FF11, FF21, etc.

The connection relationships among the RSE, the FF11, the register FPR, the operand register OPRG, the shift operator SFT1, the register SFRG1, the selector SEL1, the FMA operator, and the result register RR are the same as in FIG. 1.

The FF12, the FF21, and the FF31 are connected in series to the output of the RSE and propagate a valid signal VLD. The output of the FF31 is connected to the input terminal 0 of the selector SEL2 and the input of the AND circuit AND1. The FF22 and FF32 are connected in series between the FF11 and the AND circuit AND1, and propagate a shift enable signal BX1-USE. The shift enable signal BX1-USE is an example of control information output by the instruction decoder 13. The FF22 outputs a shift enable signal BX-USE received from the FF11 as the shift enable signal BX1-USE. The output of the FF32 is connected to the enable terminal ENB of the shift operator SFT1 and the input of the AND circuit AND1.

The output of the AND circuit AND1 is connected to the input of the FF41 and the input of the OR circuit OR1. The output of the FF41 is connected to the input terminal 1 of the selector SEL2 and the input of the AND circuit AND2. The output of the AND circuit AND2 is connected to the input of the OR circuit OR1. The output of the OR circuit OR1 is connected to the input of the FF42. The FF42 outputs the selection signal BX1-SEL. The output of the FF42 is connected to the selection terminals of the selectors SEL1 and SEL2 and the input of the AND circuit AND2.

The output of the selector SEL2 is connected to the FMA operator. The selector SEL2 supplies the FMA operator with the valid signal VLD from the FF31 received at the input terminal 0 or the valid signal VLD from the FF41 received at the input terminal 1, according to a logical value of the selection signal BX1-SEL. For example, the selector SEL2 selects the output of the FF41 in the X1 cycle of the FMLA (by element) instruction and selects the output of the FF31 in the X1 cycle of the operation instruction other than the FMLA (by element) instruction.

The RSE outputs a high-level valid signal VLD along with the operation instruction. The propagation path of the valid signal VLD is indicated by a dotted line. The valid signal VLD is sequentially propagated to the P cycle, the PT cycle, and the B cycle. The valid signal VLD of the BX1 cycle is set to a high level by the AND circuit AND1 when the shift enable signal BX1-USE is enabled (high level).

The valid signal VLD of the X1 cycle is selected by the selector SEL2 according to the logic level of the selection signal BX1-SEL as well as the data output from the operand register OPRG, and is then propagated to the X2 to X4 cycles and the U cycle. The pipeline stage through which the high-level valid signal VLD is passing indicates that this pipeline stage is enabled.

The valid signal VLD propagated in the U cycle is output from the FF51 as a valid signal RS-VLD. The result data RS-DT is then written into the register FPR using the high-level valid signal RS-VLD.

When the FMLA (by element) instruction is output from the RSE, a high-level shift enable signal BX-USE, which indicates enablement, is output from the FF11 for 1 cycle in the PT cycle. The shift enable signal BX-USE is set to a high level by the instruction decoder 13 when the instruction decoder 13 in FIG. 8 decodes the FMLA (by element) instruction, and is supplied to the operation executer 20A via the RSE.

The high-level shift enable signal BX-USE output from the FF11 is output as the high-level shift enable signal BX1-USE from the FF22 in the B cycle. The shift enable signal BX1-USE is supplied to the enable terminal ENB of the shift operator SFT1 in the BX1 cycle and causes the shift operator SFT1 to execute the shift operation.

For example, when receiving the high-level enable signal ENB, the shift operator SFT1 executes shift-processing of any of the multiple operand data received from the operand register OPRG. The shift operator SFT1 outputs the shifted operand data to the register SFRG1 along with the other operand data not being subjected to shift-processing. When receiving the low-level enable signal ENB, the shift operator SFT1 does not execute the shift operation and propagates the multiple operand data received from the operand register OPRG to the register SFRG1.

Also, in the BX1 cycle, the high-level shift enable signal BX1-USE output from the FF32 is latched by the FF42 through the AND circuit AND1 that receives the high-level valid signal VLD. In the X1 cycle, the FF42 outputs the latched high-level shift enable signal BX1-USE as the high-level selection signal BX1-SEL.

In the X1 cycle, the selector SEL1 selects the output of the register SFRG1 according to the high-level selection signal BX1-SEL, and propagates the data including the operand data shifted by the shift operator SFT1 to the FMA operator. In the X1 cycle, the selector SEL2 selects the output of the FF41 according to the high-level selection signal BX1-SEL, and propagates the high-level valid signal VLD output from the AND circuit AND1 to the FMA operator.

Then, in the X1 to X4 cycles, a multiply-add operation of the FMLA (by element) instruction is executed, and the execution result is stored in the result register RR. Since the high-level selection signal BX1-SEL output from the FF42 is fed back to the input of the AND circuit AND2, the FF42 continues to output the high-level selection signal BX1-SEL while the valid signal VLD remains high.

Thus, even when the operation instruction that does not execute pre-processing is issued after the FMLA (by element) instruction, the data output from the operand register OPRG can be supplied to the FMA operator via a path through the shift operator SFT1. As a result, collision in the X1 cycle of the instruction following the FMLA (by element) instruction can be prevented, as described in FIG. 10.

The shift enable signals BX-USE and BX1-USE are set to the low level when the FMLA (by element) instruction is not issued. Thus, for example, when the FMLA instruction is issued as an instruction following the FMLA (by element) instruction, the enable terminal ENB of the shift operator SFT1 receives a low-level shift enable signal BX1-USE from the FF32, in the BX1 cycle of the following instruction.

Thus, the data of the following instruction received from the operand register OPRG can be output to the register SFRG1 without undergoing shift-processing. For example, the data used in the FMLA instruction following the FMLA (by element) instruction can be prevented from being shifted, and malfunction of the processor 100A can be prevented.

Also, when the issuance of the operation instruction from the RSE to the operation executer 20A is interrupted, that is, in a cycle in which the RSE does not issue the operation instruction, the valid signal VLD is set to the low level, and a low-level valid signal VLD is sequentially propagated to the pipeline. When the low-level valid signal is propagated to the BX1 cycle, the output of the AND circuit AND1 becomes the low level, and the output of the FF41 becomes the low level in the X1 cycle.

The output of the AND circuit AND2 changes from the high level to the low level due to the change of the valid signal VLD output from the FF41, and the FF42 changes the selection signal BX1-SEL to the low level. In this way, the selectors SEL1 and SEL2 select the input terminal 0. Therefore, the data of the FMLA instruction issued after the valid signal VLD changes to the low level can be supplied to the FMA operator without passing through the shift operator SFT1, and the FMLA instruction can be executed with a minimum number of cycles.

FIG. 10 is a diagram illustrating an example of pipeline operation when the operation executer 20A in FIG. 9 executes the multiply-add operation instruction illustrated in FIG. 2. In the execution example (1), the RSE issues the FMLA (by element) instruction and the FMLA instruction sequentially. By providing a feedback loop of the selection signal BX1-SEL by the FF42 and the AND circuit AND2 as illustrated in FIG. 9, the BX1 cycle can be added to a subsequent FMLA instruction in which no pre-processing is executed. The BX1 cycle in which no pre-processing is executed is bracketed. This enables each of the X1 to X4 and U cycles of the FMLA instruction to be shifted backward by one cycle with respect to a corresponding one of the X1 to X4 and U cycles of the FMLA (by element) instruction, thereby avoiding collision in the execution cycles of the FMA operator.

Also, the shift operator SFT1 receives a low-level enable signal ENB when executing the FMLA instruction. Therefore, the execution of pre-processing can also be prevented when the operand data of the FMLA instruction are supplied to the FMA operator via a path through the shift operator SFT1 by adding a BX1 cycle. As a result, the processor 100A can be operated normally.

The operation illustrated in the brackets in the execution example (1) indicates the operation when there is no feedback loop of the selection signal BX1-SEL by the FF42 and the AND circuit AND2 in FIG. 9. When there is no feedback loop, no BX1 cycle is inserted when executing the FMLA instruction following the FMLA (by element) instruction, and the selector SEL1 selects data from the operand register OPRG.

In this case, each of the X1 to X4 and U cycles between the FMLA (by element) instruction and the FMLA instruction is duplicated, as indicated by the bold frame, which results in collision of the execution cycles of the FMA operator. In practice, since the selector SEL1 receives a low-level selection signal BX1-SEL and selects data from the operand register OPRG, a multiply-add operation of the FMLA (by element) instruction will not be executed. Then, the result of the multiply-add operation of the FMLA (by element) instruction is output in the U cycle of the FMLA (by element) instruction.

FIG. 11 is a diagram illustrating another example of pipeline operation when the operation executer 20A in FIG. 9 executes the multiply-add operation instruction illustrated in FIG. 2. Detailed descriptions of operations similar to those illustrated in FIG. 3 are omitted. The execution example (2) and the execution example (3) are the same as the execution example (1) and the execution example (2) in FIG. 3, respectively.

In the execution example (4), the RSE alternately issues FMLA (by element) and FMLA instructions. As illustrated in FIG. 10, in the pipeline of an FMLA instruction following the FMLA (by element) instruction, a BX1 cycle that does not execute pre-processing is added, so that duplication of each of the X1 to X4 and U cycles between the FMLA (by element) and FMLA instructions can be prevented. Thus, the instructions can be executed continuously without stopping the pipeline.

In the execution example (5), the RSE issues an FMLA (by element) instruction and two FMLA instructions sequentially, and then issues an FMLA instruction with one free cycle apart. As in the execution example (1) and the execution example (4), in the pipeline of the two FMLA instructions following the FMLA (by element) instruction, a BX1 cycle that does not execute pre-processing is added, so that duplication of each of the X1 to X4 and U cycles can be prevented.

When the RSE does not issue an operation instruction in a free cycle, the valid signals VLD of the P cycle, the PT cycle, the B cycle, and the X1 cycle are sequentially set to the low level in cycles 4 through 7, although not illustrated. The low level of the valid signal VLD of the X1 cycle (FF41) is supplied to the input of the AND circuit AND2, and the FF42 changes the selection signal BX1-SEL to the low level in cycle 8. That is, the feedback loop of the selection signal BX1-SEL by the FF42 and the AND circuit AND2 is broken.

Thus, in cycle 8, the selector SEL1 receives the low-level selection signal BX1-SEL, selects the output of the operand register OPRG, and executes the X1 cycle of the FMLA instruction issued after the free cycle. As illustrated in execution example (5), when the free cycle is inserted after the execution of the FMLA (by element) instruction, the feedback loop of the selection signal BX1-SEL by the FF42 and the AND circuit AND2 can be broken. Therefore, the pipeline of the FMLA instruction issued thereafter can be executed without adding the BX1 cycle, and a decrease in the execution efficiency of the operation instruction can be prevented.

As described above, the processing performance of the FMLA (by element) instruction that executes the pre-processing can be improved while an increase in the operation latency of the FMLA instruction that does not execute the pre-processing can be prevented in this embodiment as in the above embodiment.

Furthermore, in this embodiment, when the FMLA instruction is executed following the FMLA (by element) instruction, the BX1 cycle can also be added to the FMLA instruction that does not execute the pre-processing. This allows each of the X1 to X4 and U cycles of the FMLA instruction to be shifted backward by one cycle with respect to a corresponding one of the X1 to X4 and U cycles of the FMLA (by element) instruction, and collision of the execution cycles of the FMA operator can be avoided.

Even when the BX1 cycle is added to the FMLA instruction and operand data of the FMLA instruction is supplied to the FMA operator via the shift operator SFT1, it is possible to prevent the operand data from being shifted. As a result, the processor 100A can normally execute the FMLA instruction following the FMLA (by element) instruction, and the processor 100A can operate normally. From the above, even when a single pipeline is used to execute a mixture of FMLA (by element) and FMLA instructions, operation instructions can be executed continuously without stopping the pipeline.

Also, when a free cycle is inserted after the execution of the FMLA (by element) instruction, a feedback loop of the selection signal BX1-SEL by the FF42 and the AND circuit AND2 can be broken. Therefore, the pipeline of the FMLA instruction issued thereafter can be executed without adding the BX1 cycle, and the decrease in the execution efficiency of the operation instruction can be prevented.

Figure 12:
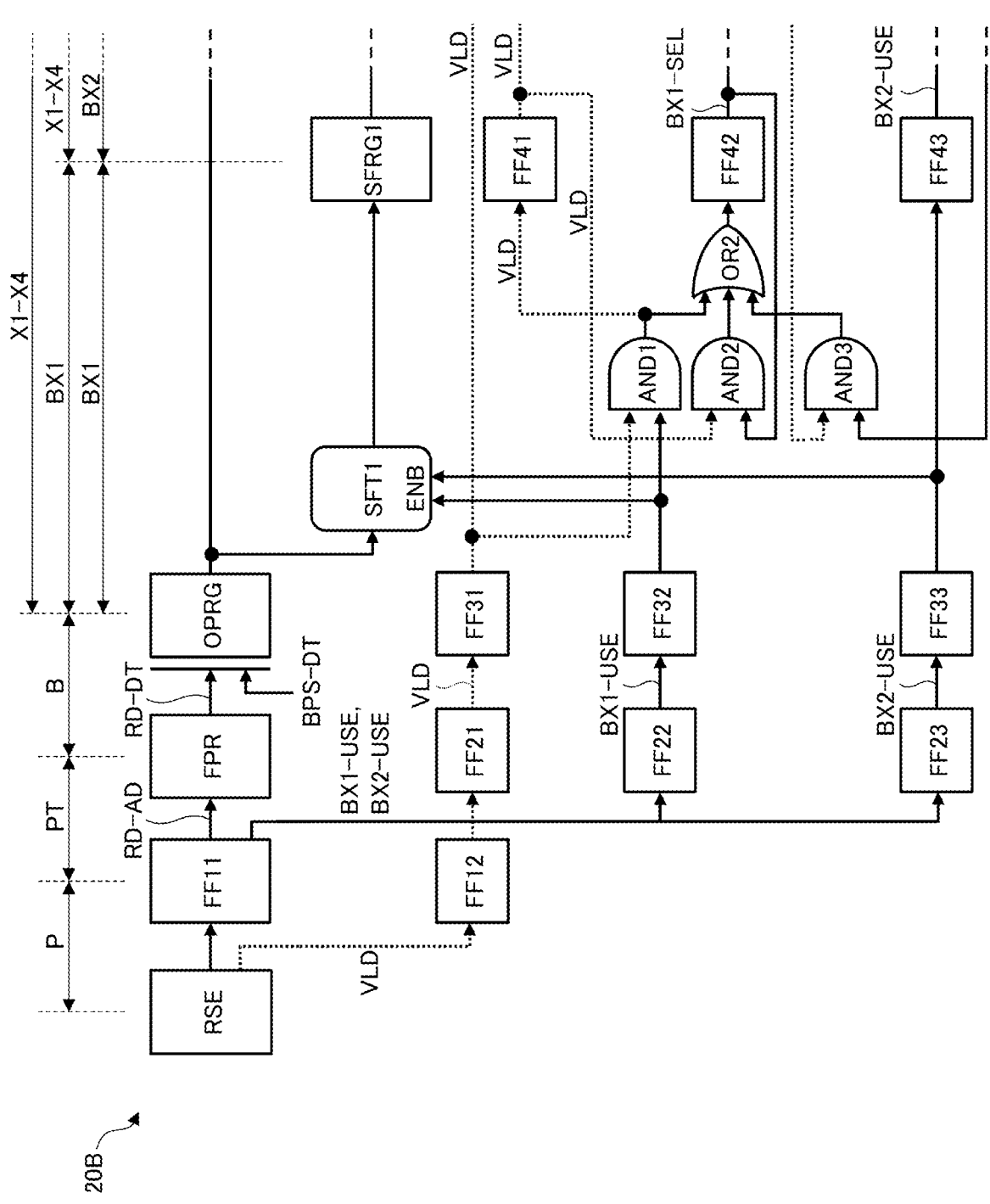
FIG. 12 is a block diagram illustrating an example of a main part of an operation executer of a processor according to still another embodiment.
Figure 13:
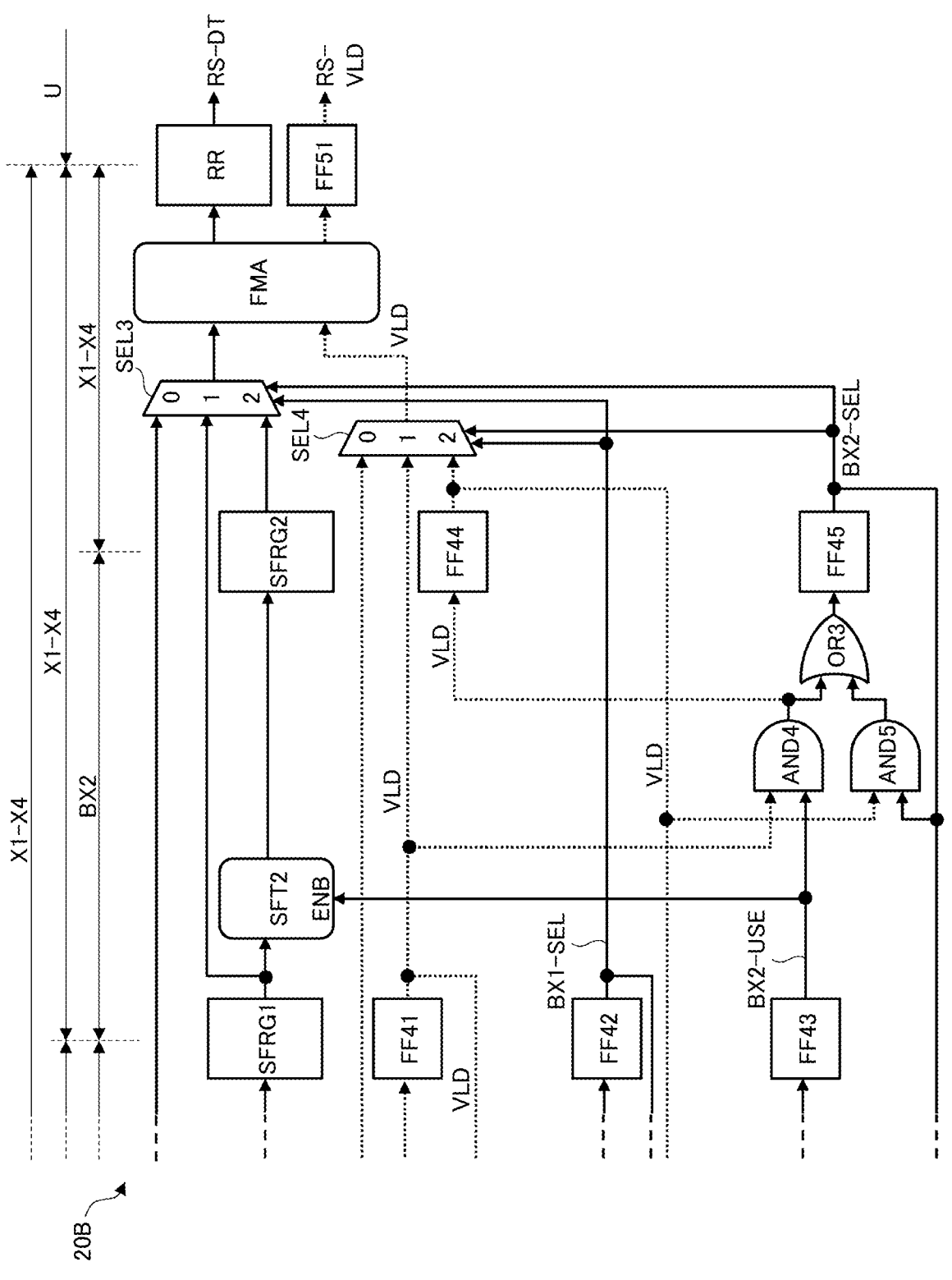
FIG. 13 is a block diagram illustrating an example of a continuation of a circuit illustrated in FIG. 12.

FIGS. 12 and 13 are diagrams illustrating an example of a main part of an operation executer in a processor according to another embodiment. Elements similar to those in FIGS. 1 and 9 are denoted by the same symbols, and detailed descriptions are omitted. The configuration of the processor in which an operation executer 20B illustrated in FIGS. 12 and 13 is installed is similar to that illustrated in FIG. 8. That is, the operation executer 20B executes the operation instructions decoded by the instruction decoder 13 illustrated in FIG. 8.

Descriptions of the clock signals and clock terminals are also omitted in FIG. 12 and FIG. 13. FIGS. 12 and 13 illustrate a pipeline including P, PT, B, BX1, BX2, X1 to X4, and U cycles. For clarity of signal flow, the register SFRG1, FF41, FF42, and FF43, which separate the BX1 and X1 cycles (or BX1 and BX2 cycles), are duplicated in both FIGS. 12 and 13.

The pipeline of the operation executer 20B illustrated in FIGS. 12 and 13 adds a BX2 cycle after the BX1 cycle. Thus, the operation executer 20B can execute the FMLA (BX1) instruction that executes the BX1 cycle, and the FMLA (BX2) instruction that executes the BX1 and BX2 cycles as pre-processing of the FMLA instruction. The FMLA (BX1) instruction and the FMLA (BX2) instruction are examples of multiple types of the second operation instruction.

For example, one cycle may not be sufficient for pre-processing such as the FMLA (by element) instruction due to the processor operating frequency or PVT (process, voltage, temperature) conditions. Or, in the case of an operation instruction that executes more complex pre-processing, the pre-processing may take multiple cycles. Therefore, it is preferable that the pre-processing be executed in one cycle or in multiple cycles.

For example, the FMLA (BX1) instruction executes pre-processing in one cycle to move the high-order 64 bits [127:64] of one 128-bit wide operand data read from the register FPR to the low-order 64 bits [63:0]. The FMLA (BX1) instruction executes pre-processing using the shift operator SFT1, similar to the FMLA (by element) instruction illustrated in FIG. 2.

For example, the FMLA (BX2) instruction executes pre-processing in two cycles to move the highest-order 64 bits [511:448] of one 512-bit wide operand data read from the register FPR to the lowest-order 64 bits [63:0]. The FMLA (BX2) instruction executes pre-processing using two shift operators SFT1 and SFT2 sequentially.

The pipeline when executing the FMLA (BX1) instruction includes P, PT, B, BX1, X1, X2, X3, X4, and U cycles, as in the FMLA (by element) instruction. The pipeline when executing the FMLA (BX2) instruction includes P, PT, B, BX1, BX2, X1, X2, X3, X4, and U cycles. Note that the pipeline when executing the FMLA instruction that does not execute pre-processing includes P, PT, B, X1, X2, X3, X4, and U cycles.

The operation executer 20B includes an FF23, an FF33, an AND circuit AND3, an FF43, a shift operator SFT2, a register SFRG2, AND circuits AND4 and AND5, an OR circuit OR3, an FF44, and an FF45, which are added to the operation executer 20A in FIG. 9. The AND circuits AND3, AND4, and AND5, and the OR circuit OR3 each have two inputs. Further, the operation executer 20B has an OR circuit OR2, and selectors SEL3 and SEL4 each having three inputs, instead of the OR circuit OR1, and the selectors SEL1 and SEL2 each having two inputs in the operation executer 20A in FIG. 9.

The AND circuits AND1, AND2, and AND3, the OR circuit OR3, and the FF42 are examples of the selection signal generator configured to generate the selection signal BX1-SEL. The AND circuits AND2 and AND3, and the FF42 are examples of a holding unit that holds the selection signal BX1-SEL. The AND circuits AND4 and the AND circuit AND5, the OR circuit OR3, and the FF45 are examples of a selection signal generator configured to generate the selection signal BX2-SEL. The AND circuit AND5 and the FF45 are examples of a holding unit that holds the selection signal BX2-SEL. The shift operator SFT1 and the register SFRG1, and the shift operator SFT2 and the register SFRG2 are respective examples of pre-processing stages.

The FF23, FF33, and FF43 are connected in series between the FF11 and the AND circuit AND4. The FF23 outputs a shift enable signal BX-USE from the FF1 to the FF33 as a shift enable signal BX2-USE. The FF33 and FF43 then propagate the shift enable signal BX2-USE. The shift enable signal BX2-USE is an example of control information output by the instruction decoder 13. The output of the FF33 is also connected to the enable terminal ENB of the shift operator SFT1. The input of the OR circuit OR2 is connected to the outputs of the AND circuits AND1, AND2, and AND3, and the output of the OR circuit OR2 is connected to the input of the FF42.

The enable terminal ENB of the shift operator SFT1 receives a high-level shift enable signal BX1-USE from the FF32 in the BX1 cycle of the FMLA (BX1) instruction. The enable terminal ENB of the shift operator SFT1 receives a high-level shift enable signal BX2-USE from the FF33 in the BX1 cycle of the FMLA (BX2) instruction. Also, the enable terminal ENB of the shift operator SFT1 receives low-level shift enable signals BX1-USE and BX2-USE from the FF32 and FF33, respectively, when the FMLA (BX1) and FMLA (BX2) instructions are not executed.

The input of the AND circuit AND4 is connected to the output of the FF41 and the output of the FF43. The output of the AND circuit AND4 is connected to the input of the FF44 and the input of the OR circuit OR3. The output of the FF44 is connected to the input terminal 2 of the selector SEL4 and the input of the AND circuit AND5. The output of the selector SEL4 is connected to the FMA operator.

The input of the AND circuit AND5 is connected to the output of the FF44 and the output of the FF45. The output of the AND circuit AND5 is connected to the input of the OR circuit OR3. The output of the OR circuit OR3 is connected to the input of the FF45. The output of the FF45 is connected to the input of the AND circuit 3, the input of the AND circuit 5, and the selection terminal of the selector SEL3. The FF45 outputs the selection signal BX2-SEL.

The shift operator SFT2 and the register SFRG2 are connected in series between the register SFRG1 and the selector SEL3. The shift operator SFT2 selects data to be shifted according to the shift enable signal BX2-USE received at the enable terminal ENB, and executes shift-processing. The shift operator SFT2 is an example of a pre-processor configured to pre-process the data held in the register SFRG1. For example, the enable terminal ENB of the shift operator SFT2 may be provided with as many as the number of bits of the code identifying the operands used in the operation or as many as the number of operands used in the operation.

The selector SEL3 propagates any of the data received at the input terminals 0 to 2 to the FMA operator according to logical values of the selection signals BX1-SEL and BX2-SEL received at the selection terminal. When the selection signals BX1-SEL and BX2-SEL have logical values 1 and 0, respectively, the selector SEL3 selects the output of the register SFRG1. When the selection signals BX1-SEL and BX2-SEL have logical values 0 and 1, respectively, the selector SEL3 selects the output of the register SFRG2. When the selection signals BX1-SEL and BX2-SEL both have logical values 0, the selector SEL3 selects the output of the operand register OPRG.

In other words, the selector SEL3 selects the output of the register SFRG1 in the X1 cycle when the FMLA (BX1) instruction is executed. The selector SEL3 selects the output of the register SFRG2 in the X1 cycle when the FMLA (BX2) instruction is executed. The selector SEL3 selects the output of the operand register OPRG in the X1 cycle when the operation instruction other than the FMLA (BX1) instruction and the FMLA (BX2) instruction is executed.

The selector SEL4 propagates to the FMA operator any of the valid signals VLD received at the input terminals 0 to 2 according to the logical values of the selection signals BX1-SEL and BX2-SEL. When the selection signals BX1-SEL and BX2-SEL have logical values 1 and 0, respectively, the selector SEL4 selects the output of the FF41. When the selection signals BX1-SEL and BX2-SEL have logical values 0 and 1, the selector SEL4 selects the output of the FF44. When the selection signals BX1-SEL and BX2-SEL both have logical values 0, the selector SEL4 selects the output of the FF31.

In other words, the selector SEL4 selects the output of the FF41 in the X1 cycle when the FMLA (BX1) instruction is executed. The selector SEL4 selects the output of the FF44 in the X1 cycle when the FMLA (BX2) instruction is executed. The selector SEL4 selects the output of the FF31 in the X1 cycle when the operation instruction other than the FMLA (BX1) instruction and the FMLA (BX2) instruction is executed.

When decoding an FMLA (BX1) instruction, the instruction decoder 13 (FIG. 8) outputs a high-level shift enable signal BX1-USE to the RSE along with the decoded FMLA (BX1) instruction. When the FMLA (BX1) instruction is output from the RSE, the high-level shift enable signal BX1-USE is output from the FF11 for one cycle in the PT cycle. At this time, the shift enable signal BX2-USE is set to the low level. The shift enable signal BX1-USE indicates that the pre-processing of the FMLA (BX1) instruction is executed in one cycle.

When decoding an FMLA (BX2) instruction, the instruction decoder 13 outputs a high-level shift enable signal BX2-USE to the RSE along with the decoded FMLA (BX2) instruction. When the FMLA (BX2) instruction is output from the RSE, the high-level shift enable signal BX2-USE is output from the FF11 for one cycle in the PT cycle. At this time, the shift enable signal BX1-USE is set to the low level. The shift enable signal BX2-USE indicates that the pre-processing of the FMLA (BX2) instruction is executed in two cycles.

When the instruction decoder 13 decodes an instruction other than the FMLA (BX1) instruction and the FMLA (BX2) instruction, the instruction decoder 13 outputs low-level shift enable signals BX1-USE and BX2-USE to the RSE along with the decoded instruction. Therefore, in the PT cycle of the operation instruction other than the FMLA (BX1) instruction and the FMLA (BX2) instruction, the shift enable signals BX1-USE and BX2-USE are both set to the low level.

For example, when the RSE issues an operation instruction other than the FMLA (BX1) instruction and the FMLA (BX2) instruction alone, the operation executer 20B does not operate the shift operators SFT1 and SFT2, and sets the selection signals BX1-SEL and BX2-SEL to the low level. Thus, in the X1 cycle, the selector SEL3 selects the output of the operand register OPRG, and the selector SEL4 selects a valid signal VLD from the FF31. Then, the multiply-add operation by the FMA operator is executed without any pre-processing.

When the RSE issues the FMLA (BX1) instruction, the shift enable signal BX1-USE becomes a high level in the BX1 cycle, and the shift operator SFT1 becomes effective. The shift operator SFT1 executes shift-processing of any of the operand data output from the operand register OPRG in the BX1 cycle, and stores the shift-processing result in the register SFRG1.

The FF42 that receives the high-level shift enable signal BX1-USE via the AND circuit AND1 and the OR circuit OR2 outputs the high-level selection signal BX1-SEL in the X1 cycle. Accordingly, the data held in the register SFRG1 is selected by the selector SEL3, and a valid signal VLD from the FF41 is selected by the selector SEL4. Then, the multiply-add operation is executed by the FMA operator using the data selected by the selector SEL3.

Since the high-level selection signal BX1-SEL output from the FF42 is fed back to the input of the AND circuit AND2, the FF42 continues to output the high-level selection signal BX1-SEL while the valid signal VLD remains high. Thus, even when an operation instruction that does not execute pre-processing is issued after the FMLA (BX1) instruction, the data output from the operand register OPRG can be supplied to the FMA operator via a path through the shift operator SFT1.

When the RSE does not issue an operation instruction, the RSE sets the valid signal VLD to the low level. When the FF41 outputs a low-level valid signal VLD in the X1 cycle, the output of the AND circuit AND2 is set to the low level regardless of the levels of the selection signal BX1-SEL. This breaks a feedback loop when there is the feedback loop of the selection signal BX1-SEL by the FF42 and the AND circuit AND2, and the selection signal BX1-SEL changes from the high level to the low level.

When the RSE issues the FMLA (BX2) instruction, the shift enable signal BX2-USE becomes high level in the BX1 cycle, and the FF43 outputs the high-level selection signal BX2-SEL in the BX2 cycle. This enables the shift operator SFT1 in the BX1 cycle and the shift operator SFT2 in the BX2 cycle.

The shift operator SFT1 executes shift-processing in the BX1 cycle as in the execution of the FMLA (BX1) instruction, and stores the shift-processing result in the register SFRG1. The shift operator SFT2 executes shift-processing on the shift-processing result stored in the register SFRG1 in the BX2 cycle, and stores the shift-processing result in the register SFRG2.

The FF45 that receives the high-level shift enable signal BX2-USE via the AND circuit AND4 and the OR circuit OR3 outputs the high-level selection signal BX2-SEL in the X1 cycle. Accordingly, the data held in the register SFRG2 is selected by the selector SEL3, and a valid signal VLD from the FF44 is selected by the selector SEL4. The mul-
tiply-add operation is then executed by the FMA operator
using the data selected by the selector SEL3.

Since the high-level selection signal BX2-SEL output
from the FF45 is fed back to the input of the AND circuit
AND3, the FF42 continues to output the high-level selection
signal BX1-SEL while the valid signal VLD remains high.
Also, since the high-level selection signal BX2-SEL output
from the FF45 is fed back to the input of the AND circuit
AND5, the FF45 continues to output the high-level selection
signal BX2-SEL while the valid signal VLD remains high.
Thus, when an operation instruction that does not execute
pre-processing is issued after the FMLA (BX2) instruction,
the data output from the operand register OPRG can be
supplied to the FMA operator via a path passing through the
shift operators SFT1 and SFT2.

When the RSE that does not issue the operation instruc-
tion sets the valid signal VLD to the low level, the FF41
outputs the low-level valid signal VLD in the X1 cycle, and
the output of the AND circuit AND2 is set to the low level
regardless of the levels of the selection signal BX1-SEL.
This breaks a feedback loop when there is the feedback loop
of the selection signal BX1-SEL by the FF42 and the AND
circuit AND2, and the selection signal BX1-SEL changes
from the high level to the low level.

Similarly, when the RSE sets the valid signal VLD to the
low level, the FF44 outputs the low-level valid signal VLD
in the X1 cycle, and the output of the AND circuit AND5 is
set to the low level regardless of the levels of the selection
signal BX2-SEL. This breaks a feedback loop when there is
the feedback loop of the selection signal BX2-SEL by the
FF45 and the AND circuit AND5, and the selection signal
BX2-SEL changes from the high level to the low level.

FIG. 14 is a diagram illustrating an example of pipeline
operation when the operation executer 20B in FIG. 12 and
FIG. 13 executes a multiply-add operation instruction. In the
execution example (1), the RSE issues the FMLA (BX1)
instruction and the FMLA instruction sequentially. The
operation of the execution example (1) is similar to that of
FIG. 10 except that the FMLA (BX1) instruction is executed
instead of the FMLA (by element) instruction.

The operation illustrated in the upper part of the execution
example (1) is implemented when the operation of the shift
operator SFT1 is disabled in the BX1 cycle of the FMLA
instruction, and the output of the register SFRG1 is selected
in the X1 cycle of the FMLA instruction by the feedback
loop of the selection signal BX1-SEL.

In the execution example (1), collision between the X1 to
X4 and U cycles of the FMLA (BX1) instruction and the X1
to X4 and U cycles of the subsequent FMLA instruction can
be prevented by inserting a BX1 cycle, which does not
execute shift-processing, into the pipeline processing of the
FMLA instruction.

On the other hand, when the BX1 cycle, which does not
execute shift-processing, is not inserted into the pipeline
processing of the FMLA instruction, collision occurs
between the X1 to X4 and U cycles of the first FMLA (BX1)
instruction and the X1 to X4 and U cycles of the subsequent
FMLA instruction, as indicated by the bold frame within the
square brackets in the execution example (1).

In the execution example (2), the RSE issues an FMLA
(BX2) instruction two cycles after the issuance of the FMLA
instruction. That is, there is a free cycle between the issuance
of an FMLA (BX2) instruction and the issuance of an FMLA
instruction. When the FMLA (BX2) instruction is executed,
a high-level shift enable signal BX2-USE is propagated
sequentially in the pipeline.

The high-level shift enable signal BX2-USE is output to
the enable terminal ENB of the shift operator SFT1 in the
BX1 cycle, and is output to the enable terminal ENB of the
shift operator SFT2 in the BX2 cycle. As a result, one of the
operands output from the operand register OPRG is sequen-
tially shifted by the shift operators SFT1 and SFT2.

Then, the selector SEL3 receives the low-level selection
signal BX1-SEL and the high-level selection signal BX2-
SEL in the X1 cycle, and selects the output of the register
SFRG2 holding the data shifted by the shift operators SFT1
and SFT2. The FMA operator uses the shifted data to
execute the multiply-add operation in the X1 to X4 cycles.

In the execution example (2), by inserting the BX1 cycle,
which does not execute shift-processing, into the pipeline
processing of the FMLA instruction, collision between the
X1 to X4 and U cycles of the FMLA (BX2) instruction and
the X1 to X4 and U cycles of the subsequent FMLA
instruction can be prevented. On the other hand, when the
BX1 cycle, which does not execute shift-processing, is not
inserted into the pipeline processing of the FMLA instruc-
tion, collision occurs between the X1 to X4 and U cycles of
the first FMLA (BX2) instruction and the X1 to X4 and U
cycles of the subsequent FMLA instruction, as indicated by
the bold frames in the square brackets in the execution
example (2).

FIG. 15 is a diagram illustrating another example of
pipeline operation when the operation executer 20B in FIG.
12 and FIG. 13 executes a multiply-add operation instruc-
tion. In the execution example (3), the RSE issues the FMLA
(BX2) instruction and the FMLA instruction (BX1) sequen-
tially. In the execution example (4), the RSE issues the two
FMLA (BX2) instructions and the FMLA instruction
sequentially.

In the execution example (3), in the pipeline of the FMLA
(BX2) instruction, the shift operator SFT1 is operated by the
high-level shift enable signal BX1-USE in the BX1 cycle,
and one shift-processing of the operand data from the
operand register OPRG is executed. The data after the
shift-processing is stored in the register SFRG1 along with
other operand data.

In addition, in the BX2 cycle, the shift operator SFT2 is
operated by the high-level shift enable signal BX2-USE, and
further shift-processing of the data shifted from the register
SFRG1 is executed. The data after the shift-processing is
stored in the register SFRG2 along with other operand data.
In the BX2 cycle, the selection signal BX1-SEL is main-
tained at a high level by the feedback loop by the FF42 and
the AND circuit AND2.

The FF42 sets the selection signal BX1-SEL to a high
level in the BX2 cycle. The FF45 sets the selection signal
BX2-SEL to a high level in the X1 cycle. Therefore, the
selector SEL3 outputs the data held in the register SFRG2 in
the X1 cycle to the FMA operator. Then, in the X1 to X4
cycles, the FMA operator executes a multiply-add operation.
The selection signal BX1-SEL is maintained at a high level
by a feedback loop by the FF42 and the AND circuit AND2,
and the selection signal BX2-SEL is maintained at a high
level by a feedback loop by the FF45 and the AND circuit
AND5.

In the pipeline of the FMLA (BX1) instruction that is
executed following the FMLA (BX2) instruction, the shift
operator SFT1 is operated by the high-level shift enable
signal BX1-USE in the BX1 cycle, and one shift-processing
of the operand data is executed. The shifted operand data is
stored in the register SFRG1 along with other operand data.

When issuing an FMLA (BX1) instruction, the RSE
outputs a low-level shift enable signal BX2-USE, and the FF43 outputs a low-level shift enable signal BX2-USE in the BX2 cycle. The shift operator SFT2 receives the low-level shift enable signal BX2-USE and stores the data from the register SFRG1 in the register SFRG2 without undergoing shift-processing (pre-processing). The BX2 cycle without undergoing shift-processing is bracketed.

The selection signal BX1-SEL is set to a high level, and the selection signal BX1-SEL is maintained at a high level by a feedback loop by the FF42 and the AND circuit AND2. Therefore, the selector SEL3 selects the output of the register SFRG1 and propagates the output of the register SFRG1 to the FMA operator in the X1 cycle. Then, in the X1 to X4 cycles, the FMA operator executes a multiply-add operation.

In the execution example (3), a BX2 cycle in which shift-processing is not executed is inserted into the pipeline processing of the FMLA (BX1) instruction to generate a feedback loop of the selection signal BX1-SEL by the FF42 and the AND circuit AND2. This prevents collision between the X1 to X4 and U cycles of the FMLA (BX2) instruction and the X1 to X4 and U cycles of the subsequent FMLA (BX1) instruction.

On the other hand, when a feedback loop is not generated by the FF42 and the AND circuit AND2, the X1 to X4 and U cycles of the FMLA (BX2) instruction and those of the subsequent FMLA (BX1) instruction collide, as illustrated in the bold frame within the square brackets in the execution example (3).

In the execution example (4), the pipelines of the first FMLA instruction (BX2) and the second FMLA instruction (BX2) execute 10 stages from the P cycle to the U cycle without duplication, shifting by one cycle. The operation of the pipeline of the first FMLA instruction (BX2) generates a feedback loop of the selection signal BX1-SEL by the FF42 and the AND circuit AND2, and the selection signal BX1-SEL is maintained at a high level. Also, a feedback loop of the selection signal BX2-SEL by the FF45 and the AND circuit AND5 is generated, and the selection signal BX2-SEL is maintained at a high level.

Then, in the pipeline of FMLA instruction, since the shift operator SFT1 receives low-level shift enable signals BX1-USE and BX2-USE in the BX1 cycle, the shift operator SFT1 does not execute shift-processing (pre-processing). The shift operator SFT1 stores data from the operand register OPRG as it is in the register SFRG1. Since the shift operator SFT2 receives the low-level shift enable signal BX2-USE in the BX2 cycle, the shift operator SFT2 does not execute shift-processing (pre-processing). The shift operator SFT2 stores in the register SFRG2 data from the register SFRG1, which does not execute shift-processing. The BX1 and BX2 cycles, in which the shift-processing has not been executed, are bracketed.

The selector SEL3 receives high-level shift enable signals BX1-USE and BX2-USE in the X1 cycle, selects the output of the register SFRG2, and propagates the output of the register SFRG2 to the FMA operator. Then, in the X1 to X4 cycles, the FMA operator executes a multiply-add operation using the data propagated from the register SFRG2.

In the execution example (4), the BX1 cycle and the BX2 cycle in which shift-processing is not executed are inserted into the pipeline processing of the FMLA instruction to generate a feedback loop of the selection signal BX1-SEL and a feedback loop of the selection signal BX2-SEL. This prevents collision between the X1 to X4 and U cycles of the FMLA (BX2) instruction and the X1 to X4 and U cycles of the subsequent FMLA instruction.

On the other hand, the timing when no feedback loop of the selection signals BX1-SEL and BX2-SEL is generated is illustrated in the upper one of the timing diagrams within the square brackets of the execution example (4). In the upper timing diagram within the square brackets of the execution example (4), the X1 to X4 and U cycles of the first FMLA (BX2) instruction collide with the X1 to X4 and U cycles of the subsequent FMLA instruction, as illustrated in the bold frame.

In addition, the timing when a feedback loop of the selection signal BX2-SEL is not generated is illustrated in the lower one of the timing diagrams within the square brackets of the execution example (4). In the lower timing diagram within the square brackets of the execution example (4), the X1 to X4 and U cycles of the second FMLA (BX2) instruction collide with the X1 to X4 and U cycles of the subsequent FMLA instruction, as illustrated in the bold frame.

FIG. 16 is a diagram illustrating yet another example of pipeline operation when the operation executer 20B in FIGS. 12 and 13 executes a multiply-add operation instruction. A detailed description of the same operation as in the execution example (4) in FIG. 15 is omitted.

The execution example (5) is a diagram illustrating an example of the operation when the FMLA instruction is executed after the operation in the execution example (4) in FIG. 15 with interposing one free cycle in between. In the free cycle in which the RSE does not issue the operation instruction, the valid signal VLD of each cycle is sequentially set to the low level, although not illustrated. Then, the low level of the valid signal VLD of the BX2 cycle (FF41) is supplied to the input of the AND circuit AND2.

However, a high-level valid signal of the X1 cycle (FF44) is supplied to the input of the AND circuit AND3. Therefore, the feedback loop by the FF42 and the AND circuit AND3 is not broken until cycle 9, and the selection signal BX1-SEL is maintained at a high level until cycle 8. On the other hand, the FF45 changes the selection signal BX2-SEL to a low level in cycle 8, so the feedback loop of the selection signal BX2-SEL by the FF45 and the AND circuit AND5 is broken at cycle 8.

Therefore, in cycle 8, the selector SEL3 receives the high-level selection signal BX1-SEL and the low-level selection signal BX2-SEL, and selects the output of the register SFRG1. Then, the BX1 cycle (without shift-processing) of the FMLA instruction issued after the free cycle is executed.

By inserting the BX1 cycle, collision between the X1 to X4 and U cycles of the FMLA instruction before the free cycle and the X1 to X4 and U cycles of the FMLA instruction after the free cycle can be prevented. Moreover, since the BX2 cycle is not inserted into the FMLA instruction after the free cycle, the decrease in the execution efficiency of the operation instruction can be prevented.

The execution example (6) is a diagram illustrating an example of the operation when the FMLA instruction is executed with two free cycles in between after the operation of the execution example (4) in FIG. 15. The operation up to the first free cycle is the same as in the execution example (5). Since the selection signal BX2-SEL changes to the low level in cycle 8, the feedback loop of the selection signal BX2-SEL by the FF45 and the AND circuit AND5 is broken.

In the execution example (6), in cycle 9 of the second free cycle, the FF42 receives the low level of the selection signal BX2-SEL through the AND circuit AND3 and changes the selection signal BX1-SEL to the low level. This breaks the feedback loop of the selection signal BX1-SEL by the FF42 and the AND circuit AND3. Then, in cycle 9, the selector SEL3 receives the low-level selection signals BX1-SEL and BX2-SEL and selects the output of the operand register OPRG. Then, in cycle 9, the X1 cycle of the FMLA instruction issued after the free cycle is executed.

In execution example (6), the feedback loop of selection signal BX2-SEL by the FF45 and the AND circuit AND5 and the feedback loop by the FF42 and the AND circuit AND3 are sequentially broken. This may prevent the insertion of BX1 and BX2 cycles into the pipeline of an FMLA instruction after the insertion of two or more free cycles, and may prevent the decrease in the execution efficiency of the operation instruction.

As described above, the processing performance of the FMLA (BX1) and FMLA (BX2) instructions that execute pre-processing can be improved, while the increase in the operation latency of the FMLA instructions that do not execute pre-processing can be prevented in this embodiment as well as in the above-described embodiments. When the FMLA instruction is executed following the FMLA (BX1) instruction, the BX1 cycle can also be added to the FMLA instruction that does not execute pre-processing, and the collision of the execution cycles of the FMA operator can be avoided.

Even when a BX1 cycle is added to the FMLA instruction, and the operand data is supplied to the shift operator SFT1, the operand data can be prevented from being shifted. As a result, the processor according to this embodiment can normally execute the FMLA instruction following the FMLA (BX1) instruction, and the processor can operate normally.

Furthermore, in this embodiment, when the FMLA instruction is executed following the FMLA (BX2) instruction, the BX1 and BX2 cycles can also be added to the FMLA instruction in which no pre-processing is executed, thereby avoiding the collision of the execution cycles of the FMA operator. When the FMLA instruction (BX1) is executed following the FMLA (BX2) instruction, the BX2 cycle can also be added to the FMLA instruction (BX1) in which no pre-processing by the shift operator SFT2 is executed, thereby avoiding collision of the execution cycles of the FMA operator.

Moreover, when a free cycle is inserted after the execution of the FMLA (BX2) instruction, a feedback loop of the selection signal BX2-SEL and a feedback loop of the selection signal BX1-SEL can be sequentially broken. Therefore, the pipeline of the FMLA instruction issued thereafter can be executed without adding the BX2 cycle or without adding the BX1 cycle and the BX2 cycle, and the decrease in the execution efficiency of the operation instruction can be prevented.

In the operation executer 20B illustrated in FIG. 12 and FIG. 13, an example is illustrated in which 1 cycle or 2 cycles can be inserted to execute the pre-processing before the multiply-add operation. However, an operation executer in which 3 cycles or more of the pre-processing execution cycles can be inserted before the multiply-add operation may be provided. In this case, when an operation instruction for executing one pre-processing cycle and an operation instruction for executing two or more pre-processing cycles are mixed and are executed consecutively, these operation instructions can be executed consecutively without stopping the pipeline.

In the above embodiments, examples of the operation executers 20 and 20A that execute the FMLA (by element) instruction for executing shift-processing of the operand data as pre-processing have been described. In the above embodiments, an example of the operation executer 20B that executes the FMLA (BX1) instruction or the FMLA (BX2) instruction for executing shift-processing of the operand data as pre-processing has been described. However, the pre-processing is not limited to shift-processing, and the operators are not limited to the floating-point multiply-add operators.

For example, the ADDP (vector) instruction in ARM's instruction set architecture is an operation instruction that adds adjacent elements of the same operands. When an ADDP (vector) instruction is executed using an ordinary adder, pre-processing is required to put the data to be added into the first and second operands before executing the addition. Pre-processing is a process in which even and odd elements are separated into first and second operands.

For example, a pre-processor and an adder for executing ADDP (vector) instructions can be provided in place of the shift operator SFT1 and the FMA operator in FIG. 9. Thus, an adder for executing normal addition instructions can be used without providing a dedicated adder for ADDP (vector) instructions.

By improving the processing performance of the processor described above, the processing performance of a system such as a server in which the processor is installed can be improved, and the time required for scientific and technological calculations, deep learning or various simulations can be shortened.

The above detailed description will clarify the features and advantages of the embodiments. It is intended that the claims extend to the features and advantages of the aforementioned embodiments to the extent that they do not deviate from the spirit and scope of the claims. Also, any person with ordinary knowledge in the art should be able to easily come up with all the improvements and modifications. Therefore, there is no intention to limit the scope of inventive embodiments to those described above, and it is possible to rely on suitable improvements and equivalents included in the scope disclosed in the embodiments.

According to the embodiments, it is possible to improve the processing performance of an operation instruction that executes pre-processing while preventing an increase in operation latency of an operation instruction that does not execute pre-processing.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A processor comprising:

an instruction decoder; and an operation executor configured to execute pipeline processing of an operation instruction, wherein the operation executor includes a first register configured to hold data to be used for an operation, a pre-processor configured to pre-process the data held in the first register, a second register configured to hold the data pre-processed by the pre-processor, an operator configured to execute the operation on the data held in the first register or the data held in the second register, and a selector configured to connect an output of the first register or an output of the second register to an input of the operator, wherein the instruction decoder generates control information that causes the data held in the first register and input to the pre-processor to be output from the pre-processor without pre-processing the data held in the first register, wherein the instruction decoder is configured to decode a first operation instruction and a second operation instruction, the first operation instruction causing the operator to execute a first operation on the data held in the first register without allowing the pre-processor to pre-process the data held in the first register, and the second operation instruction causing the pre-processor to pre-process the data held in the first register and then causing the operator to execute a second operation on the pre-processed data, and wherein the processor further comprises a selection signal generator configured to generate a selection signal that causes the selector to select an output of the second register in a cycle in which the operator executes the second operation on the data pre-processed according to the second operation instruction, and in a cycle in which the operator executes the first operation according to the first operation instruction when the first operation instruction is supplied to the operation executor following the second operation instruction.

2. The processor as claimed in claim 1, wherein the selection signal generator has a holding unit configured to hold the selection signal generated corresponding to the second operation instruction while a subsequent operation instruction continues, and to generate a selection signal that causes the selector to select the output of the first register when the subsequent operation instruction is interrupted.

3. A processor comprising:

an instruction decoder;

an operation executor configured to execute pipeline processing of an operation instruction, wherein the operation executor includes a first register configured to hold data to be used for an operation, a pre-processor configured to pre-process the data held in the first register, a second register configured to hold the data pre-processed by the pre-processor, an operator configured to execute the operation on the data held in the first register or the data held in the second register, and a selector configured to connect an output of the first register or an output of the second register to an input of the operator, and wherein the instruction decoder generates control information that causes the data held in the first register to be output from the pre-processor without pre-processing the data held in the first register;

a plurality of pre-processing stages connected in series between the first register and the selector, the plurality of pre-processing stages each including the pre-processor and the second register, wherein the instruction decoder is configured to decode a first operation instruction and a plurality of types of second operation instructions, the first operation instruction causing the operator to execute a first operation on the data held in the first register without allowing the pre-processor to pre-process the data held in the first register, each of the plurality of types of the second operation instructions causing the pre-processor to pre-process the data held in the first register and then causing the operator to execute a second operation on the pre-processed data, and a number of the plurality of types of the second operation instructions corresponding to a number of the pre-processing stages that pre-process data; and a selection signal generator configured to generate a selection signal that causes the selector to select an output of the second register, the second register being configured to hold the data pre-processed by one of the second operation instructions, in a cycle in which the operator executes the second operation on the data pre-processed according to one or more of the plurality of types of the second operation instructions, and in a cycle in which the operator executes the first operation according to the first operation instruction when the first operation instruction following one of the plurality of types of the second operation instructions is supplied to the operation executor, wherein the instruction decoder generates control information that causes data input to the pre-processor in a corresponding one of the plurality of the pre-processing stages to be output from the corresponding one of the pre-processors without pre-processing the data, based on a decoded result of the first operation instruction.

4. The processor as claimed in claim 3, wherein the selection signal generator has a plurality of holding units corresponding to the plurality of pre-processing stages, the plurality of holding units being configured to hold the selection signal generated corresponding to one of the plurality of types of the second operation instructions while a subsequent operation instruction continues, and to stop generating the selection signal when the subsequent operation instruction is interrupted, wherein the generation of the selection signal is stopped in an order from the holding unit corresponding to an earlier stage of the pre-processing stages, and wherein the selector connects one of the output of the first register and an output of a corresponding second register of a plurality of the second registers to the input of the operator, according to the selection signal that causes a corresponding holding unit of the plurality of holding units to generate or stop generating the selection signal.

5. The processor as claimed in claim 3, wherein when the second operation instruction that does not allow execution of pre-processing is decoded with respect to at least one of the pre-processors, the instruction decoder generates control information that disables pre-processing by the at least one of the pre-processors that does not execute pre-processing.

* * * * *